United States Patent
Nakanelua et al.

(10) Patent No.: US 11,367,342 B2
(45) Date of Patent: Jun. 21, 2022

(54) REAL-TIME PLAYBACK MODIFICATION FOR ACTIVITY EVENT PLAYBACK

(71) Applicant: CyberSecure IPS, LLC, Upper Marlboro, MD (US)

(72) Inventors: Bobby Nakanelua, Elizabethtown, KY (US); Scott Rye, Prince Frederick, MD (US); Stephen Sohn, Cummings, GA (US)

(73) Assignee: CyberSecure IPS, LLC, Upper Marlboro, MD (US)

( * ) Notice: Subject to any disclaimer, the term of this patent is extended or adjusted under 35 U.S.C. 154(b) by 122 days.

(21) Appl. No.: 17/003,220

(22) Filed: Aug. 26, 2020

(65) Prior Publication Data

US 2021/0067590 A1 Mar. 4, 2021

Related U.S. Application Data

(60) Provisional application No. 62/893,112, filed on Aug. 28, 2019, provisional application No. 62/893,121, filed on Aug. 28, 2019.

(51) Int. Cl.
| | |
|---|---|
| *H04L 29/08* | (2006.01) |
| *G08B 29/18* | (2006.01) |
| *G01V 8/14* | (2006.01) |
| *G08B 21/18* | (2006.01) |
| *G06K 9/62* | (2022.01) |
| *H04L 67/12* | (2022.01) |

(52) U.S. Cl.
CPC ............. *G08B 29/185* (2013.01); *G01V 8/14* (2013.01); *G06K 9/6277* (2013.01); *G06K 9/6288* (2013.01); *G08B 21/182* (2013.01); *H04L 67/12* (2013.01)

(58) Field of Classification Search
CPC .. G08B 29/185; G08B 21/182; G08B 13/186; G08B 29/24; G01V 8/14; G06K 9/6277; G06K 9/6288; G06K 9/6271; H04L 67/12; G06V 10/82; G06V 20/52
See application file for complete search history.

(56) References Cited

U.S. PATENT DOCUMENTS

| | | | | |
|---|---|---|---|---|
| 2012/0254356 | A1* | 10/2012 | Kashiwagi | ......... G06Q 30/0201 709/217 |
| 2017/0031650 | A1* | 2/2017 | Fraga | ...................... G10L 25/21 |

* cited by examiner

*Primary Examiner* — Kim T Nguyen

(74) *Attorney, Agent, or Firm* — Perkins Coie LLP

(57) ABSTRACT

In certain embodiments, real-time playback modification for activity event playback may be facilitated. In some embodiments, an event list portion and an event playback portion may be provided on a user interface, where the event playback portion is configured to present a playback of events on a location map in accordance with event detection times and a set of event layers for the event playback. While the event playback is occurring, a user selection of events may be obtained via the event list portion of the user interface. While the event playback is occurring, a set of layers for the event playback may be modified based on the user selection. In some embodiments, based on the modification to the set of layers, event layers may be overlaid onto the location map of the event playback portion of the user interface.

20 Claims, 12 Drawing Sheets

REAL-TIME PLAYBACK MODIFICATION FOR ACTIVITY EVENT PLAYBACK

INCORPORATED BY REFERENCE

This application claims the benefit of U.S. Provisional Application No. 62/893,121, entitled "Method and System for Generating Sensor Alerts Based On Continuous Adjustment of a Normal State of a Sensor," filed Aug. 28, 2019, and U.S. Provisional Application No. 62/893,112, entitled "Real-Time Playback Modification for Activity Event Playback," filed Aug. 28, 2019, each of which is hereby incorporated by reference herein in its entirety.

FIELD OF THE INVENTION

The invention relates to facilitating real-time playback modification for activity event playback.

SUMMARY OF THE INVENTION

Aspects of the invention relate to methods, apparatuses, and/or systems for reducing false positive floor sensor alerts based on continuous adjustment of a normal state of a floor sensor and for facilitating real-time playback modification for activity event playback.

One aspect of the disclosure relates to a system and/or method for reducing false positive floor sensor alerts based on continuous adjustment of a normal state of a floor sensor. In some embodiments, the system may continuously obtain a plurality of wavelength readings from a sensor and continuously adjust a normal state of the sensor based on the wavelength readings. For example, the system may adjust the normal state based on certain wavelength readings that fail to satisfy both upper and lower wavelength thresholds of the continuously adjusted normal state. In some embodiments, the system may detect an event when one or more wavelength readings from the sensor satisfy the upper or lower wavelength thresholds of the continuously-adjusted normal state. The system may determine, based on the detected event, a number of wavelength readings that satisfy the upper or lower wavelength thresholds. When the number of wavelength readings (e.g., that satisfy the upper or lower wavelength thresholds) reaches a predetermined count threshold, the system may generate an alert (e.g., a suspicious activity alert).

Another aspect of the disclosure relates to a system and/or method for facilitating real-time playback modification for activity event playback. In some embodiments, the system may provide a user interface including a first portion and a second portion. For example, the first portion may be configured to present a set of events and the second portion may be configured to present a playback of events. For example, the playback of events may be presented in accordance with event detection times and a set of event layers for the playback. Each layer of the set of layers may indicate one or more events related to alerts generated by sensors based on an event detection. In some embodiments, during the playback, the system may obtain a user selection of events via the user interface. For example, the user selection may indicate a subset of events to be presented in the playback. During playback, the system may modify a set of layers for the playback based on the user selection such that layers corresponding to the subset of events are added to the event playback. In some embodiments, the computer system may cause the layers corresponding to the subset of events to be overlaid on the second portion of the user interface. For example, the layers may be overlaid on the second portion based on the modification of the set of layers. In some embodiments, the subset of events may be presented based on detection times associated with the subset of events.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
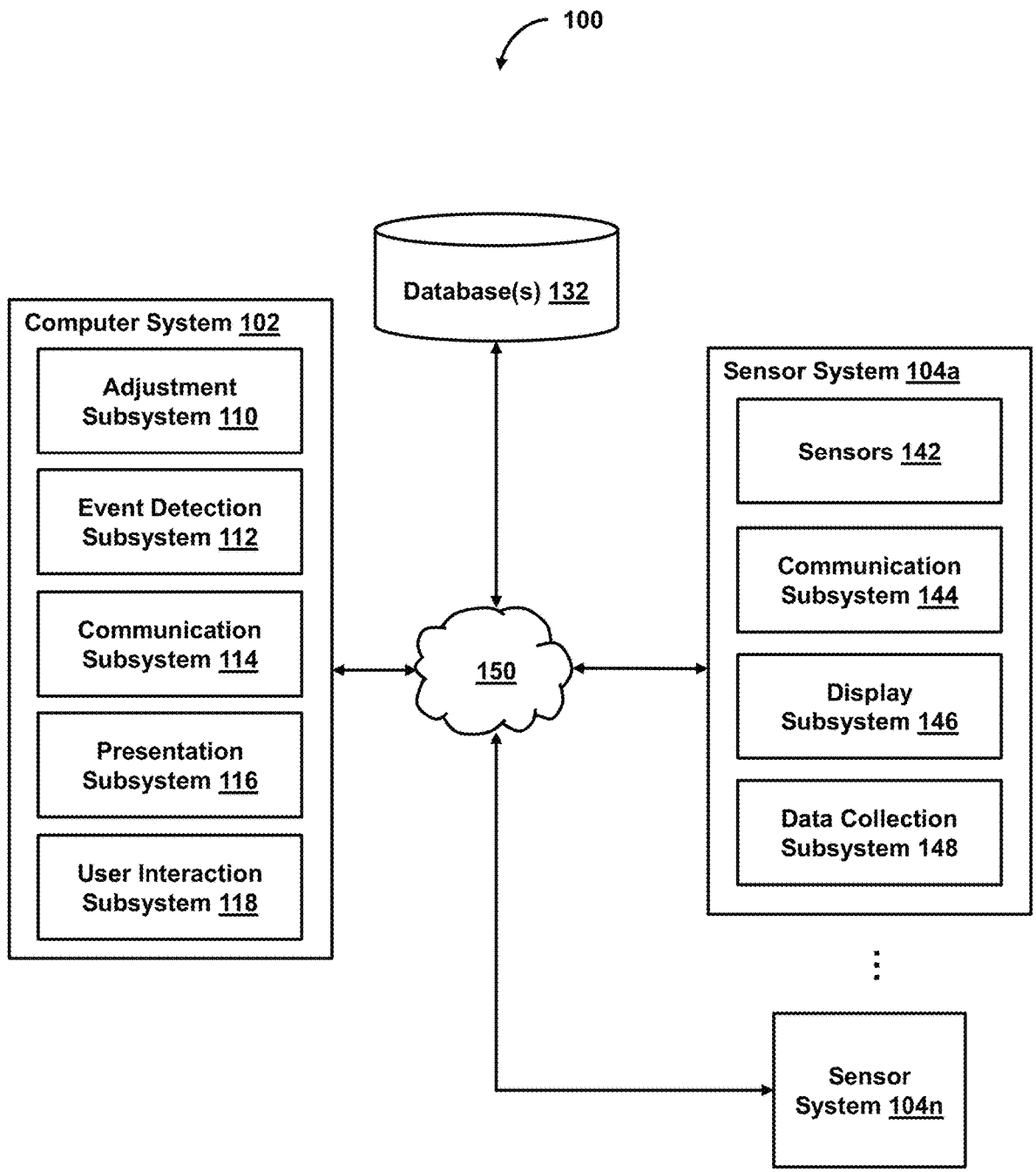
FIG. 1 shows a system for facilitating the generation of a sensor alert and for facilitating real-time playback modification for suspicious activity event playback, in accordance with one or more embodiments.

FIG. 1 shows a system 100 for facilitating the generation of a sensor alert based on continuous adjustment of a normal state of a sensor and for facilitating real-time playback modification for activity event playback, in accordance with one or more embodiments.

One aspect of the disclosure relates to a system and/or method for reducing false positive floor sensor alerts based on continuous adjustment of a normal state of a floor sensor. In some embodiments, the system 100 may continuously obtain a plurality of wavelength readings from a sensor and continuously adjust a normal state of the sensor based on the wavelength readings. For example, the system 100 may adjust the normal state based on certain wavelength readings that fail to satisfy both upper and lower wavelength thresholds of the continuously adjusted normal state. While those wavelengths readings that fall within the upper and lower thresholds are used to adjust the normal state, wavelength readings that satisfy the upper or lower wavelength thresholds may be used to detect an event. In other words, the system 100 may detect an event when one or more wavelength readings from the sensor satisfy the upper or lower wavelength thresholds of the continuously-adjusted normal state. The system 100 may determine, based on the detected event, a number of wavelength readings that satisfy the upper or lower wavelength thresholds. When the number of wavelength readings (e.g., that satisfy the upper or lower wavelength thresholds) reaches a predetermined count threshold, the system 100 may generate an alert.

Another aspect of the disclosure relates to a system and/or method for facilitating real-time playback modification for activity event playback. In some embodiments, the system 100 may provide a user interface including a first portion and a second portion. For example, the first portion may present a set of events and the second portion may present a playback of events. For example, the playback of events may be presented according to event detection times and a set of event layers for the playback. Each layer of the set of layers may indicate one or more events related to alerts generated by sensors (e.g., based on an event detection). In some embodiments, during the playback, the system 100 may obtain a user selection of events via the user interface. For example, the user selection may indicate a subset of events to be presented in the playback. In some embodiments, the user selection may additionally indicate another subset of events that is not to be presented in the playback. During playback, the system 100 may modify a set of layers for the playback based on the user selection such that layers corresponding to the subset of events are added to the event playback. In some embodiments, layers corresponding to the other subset of events (i.e., which is not to be presented in the playback) may be removed from the event playback. In some embodiments, the system 100 may cause the added layers corresponding to the subset of events to be overlaid on the second portion of the user interface. For example, the layers may be overlaid on the second portion based on the modification of the set of layers, such that the subset of events is presented based on detection times associated with the subset of events.

These methods may be used individually or in conjunction with each other and with any other methods for facilitating event detection and playback. For example, in some embodiments, system 100 may reduce false positive floor sensor alerts based on continuous adjustment of a normal state of a floor sensor and/or facilitate real-time playback modification for activity event playback. For example, as system 100 continuously adjusts the normal state of a floor sensor, the floor sensor becomes more accurate, i.e., less likely to generate a false positive alert. Reducing false positive alerts may cause system 100 to detect fewer false positive events, thereby reducing a quantity of activity events that must be listed for a user during activity event playback. The user modification of playback of activity events in real-time may be performed more quickly and efficiently due to the lack of false positive events listed on the display for selection. In another example, event playback may provide context for and additional information about detected events. For example, event playback may indicate the circumstances surrounding a sensor alert in response to a detected event. Other examples may likewise use the methods described herein in conjunction with each other or with any other methods for improving event detection and playback.

As shown in FIG. 1, system 100 may include computer system 102, sensor system 104a (or sensor systems 104a-104n), database 132, or other components. Computer system 102 may include adjustment subsystem 110, event detection subsystem 112, communication subsystem 114, presentation subsystem 116, user interaction subsystem 118, or other components. Sensor system 104a may include sensors 142, communication subsystem 144, display subsystem 146, data collection subsystem 148, or other components. In some embodiments, computer system 102 may include any type of mobile terminal, fixed terminal, or other device. By way of example, computer system 102 may include a desktop computer, a notebook computer, a tablet computer, a smartphone, a wearable device, a device on the cloud, or other device. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of sensor system 104a or other components of system 100 and while one or more operations are described herein as being performed by components of sensor system 104a, those operations may, in some embodiments, be performed by components of computer system 102 or other components of system 100.

Generation of a Sensor Alert Based on Continuous Adjustment of a Normal State of a Sensor In some embodiments, system 100 may facilitate generation of a sensor alert based on continuous adjustment of a normal state of a sensor. In some embodiments, system 100 may facilitate a reduction of false positive alerts.

In some embodiments, computer system 102 may continuously obtain a plurality of readings from a sensor 142 (or a plurality of sensors 142). The sensor 142 may include a camera, a cable tray sensor, temperature, air quality, or moisture sensors, or, for example, an optical sensor (e.g., a Fiber Bragg Grating (FBG) sensor, silicon microsphere sensor, or laser cavity sensor). Such an optical sensor may be distributed on or within a floor of a venue or infrastructure. Examples of an optical sensor may include a photoelectric sensor that uses a light transmitter and a photoelectric receiver (e.g., see FIG. 2A). The sensor 142 may be used to determine whether an object or a person is in proximity to the sensor 142. Although the optical sensor is provided as an example, it should be understood that any sensor that is capable of detecting an object or a person in proximity of the sensor may be used, including, for example, ultrasonic, capacitive, inductive, or magnetic sensors. Further, although the sensor 142 is described as being distributed on or within a floor of a venue or infrastructure, it should be understood that the placement of sensor 142 is not limited thereto and that the sensors 142 can be placed in any other location within a venue or an infrastructure.

Figure 2A:
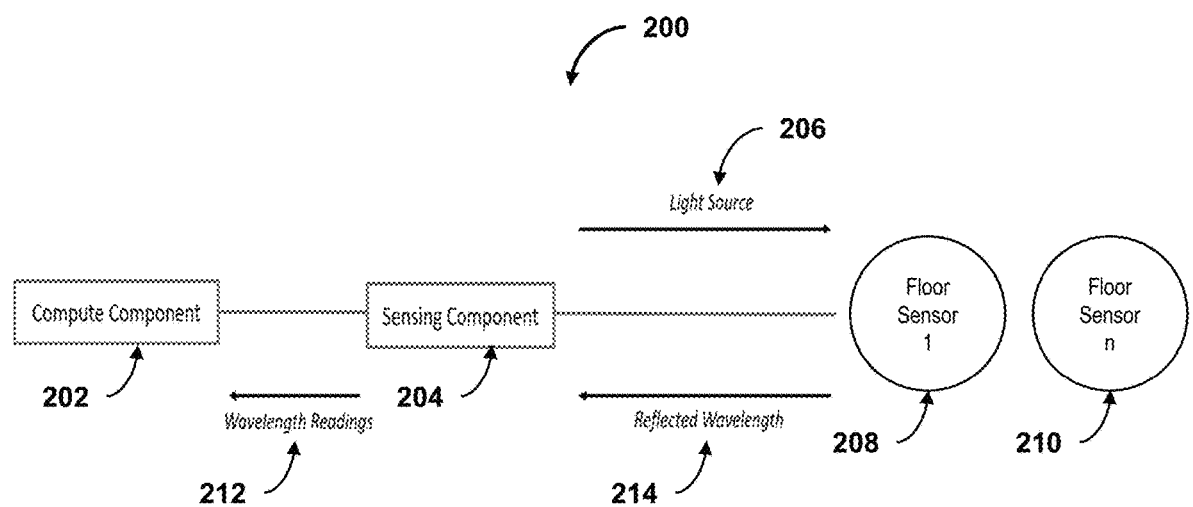
FIGS. 2A and 2B show one or more sensor systems, in accordance with one or more embodiments.

FIG. 2A shows a sensor system 200, in accordance with one or more embodiments. FIG. 2A includes floor sensor 208 and floor sensor 210 (e.g., representing floor sensors 1-*n*) and a sensing component 204. For example, each floor sensor 1-*n* may be associated with a corresponding sensing component 204 or a plurality of floor sensors may be associated with one or more sensing components 204. Although only one sensing component 204 is illustrated in FIG. 2A, it should be understood that sensor system 200 may include a plurality of sensing components 204. In some embodiments, sensing component 204 may be a light source and a receiver of light reflected from floor sensors 208/210 and floor sensors 208/210 may be reflectors (e.g., wavelength-specific reflectors). Sensors 142 illustrated in FIG. 1 may include or correspond to floor sensors 208/210, sensing component 204, and/or compute component 202 illustrated in FIG. 2A. In some embodiments, computer system 102 illustrated in FIG. 1 may include compute component 202 illustrated in FIG. 2A. In some embodiments, floor sensors 208-210 may be distributed throughout a floor system in an infrastructure. For example, floor sensors 208-210 may be integrated into an elevated floor system or into a mat that rests directly on a non-elevated floor system.

In some embodiments, computer system 102 (e.g., via data collection subsystem 148 and communication subsystem 114) may continuously obtain a plurality of wavelength readings from one or more sensors 142. As shown in FIG. 2A, sensing component 204 may continuously detect wavelengths of reflected light (e.g., reflected wavelength of light 214). The wavelength of light 214 reflected by the floor sensors 208/210 may vary based on people or objects proximate to the floor sensors 208-210. In other words, the sensing component 204 may detect a particular wavelength of light 214 (which may or may not be different from the wavelength of the light emitted (e.g., light 206 emitted by a light source of the sensing component 204) by the sensing component 204 and reflected by the floor sensors 208/210 and the wavelength of light 214 reflected by the floor sensors 208/210 may vary depending on people or objects proximate to the floor sensors 208-210. The sensing component 204 may detect unique wavelength readings 212 of the reflected light 214 and may send the unique wavelength readings 212 to compute component 202. The sensing component 204 may be an optical controller or other sensing component. The sensing component 204 may include a light emitter and a light receiver. The compute component 202 may process the unique wavelength readings 212.

Figure 2B:
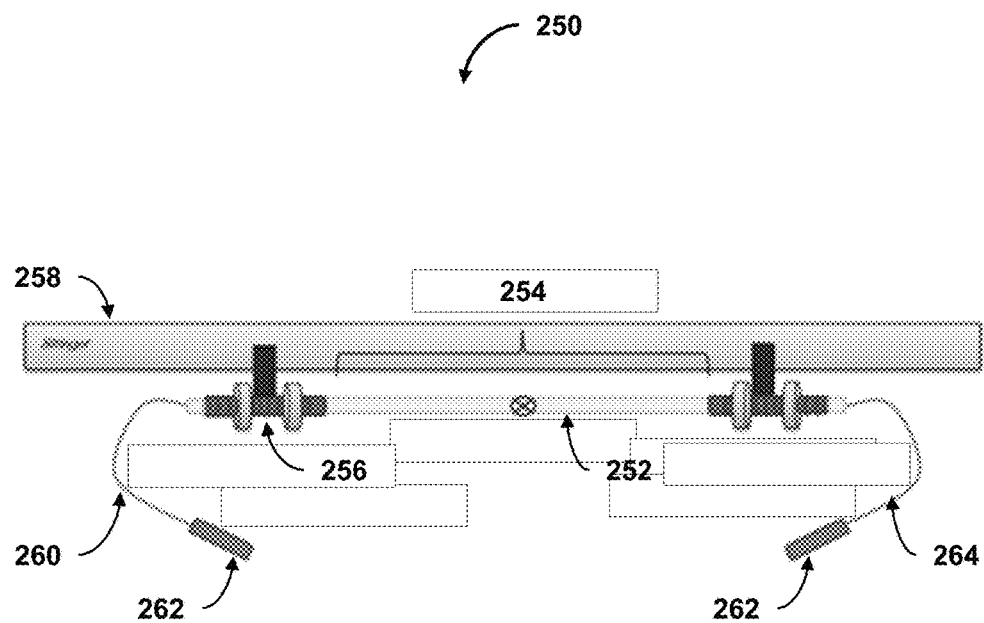

FIG. 2B shows a sensor system 250, in accordance with one or more embodiments. In some embodiments, sensor system 250 may comprise an optical sensor 252 (e.g., Fiber Bragg Grating (FBG) sensor) that may be attached to a floor 258 of an infrastructure. In some embodiments, the optical sensor 252 may detect multi-directional strain induction or vibration in floor 258. For example, the wavelength and amplitude readings measured by optical sensor 252 may change with vibration and strain. In some embodiments, sensor system 250 may include a section (e.g., ten-inch section 254) of optical sensor 252 for detecting multi-directional strain or vibrations. In some embodiments, optical sensor 252 may detect horizontal, vertical, or vibrational strain. In some embodiments, optical sensor 252 may be mounted (e.g., using mount 256) to floor 258. For example, mount 256 and the orientation of optical sensor 252 may be changed to measure the effect of strain or vibrations at various points. For example, the orientation of optical sensor 252 may affect the sensitivity of optical sensor 252. As raised floor systems are typically structured to be strong and sturdy, it is important that optical sensor 252 is mounted and oriented correctly. This ensures that optical sensor 252 is able to detect strain or vibrations caused by personnel walking across the floor or other events. In some embodiments, other components of sensor system 250 include an armored lead-in 260, connectors 262 (e.g., LC/APC connectors), and an armored lead-out 264. In some embodiments, armored lead-in 260 and armored lead-out 264 may protect the sensor from damage. For example, floor tiles in raised floor environments may be heavy or personnel working in the space may accidently snag a cable. In these examples, armored lead-in 260 and armored lead-out 264 may protect the sensor from breaking. In some embodiments, optical sensor 252 may correspond to sensors 142, as shown in FIG. 1.

Figure 3A:
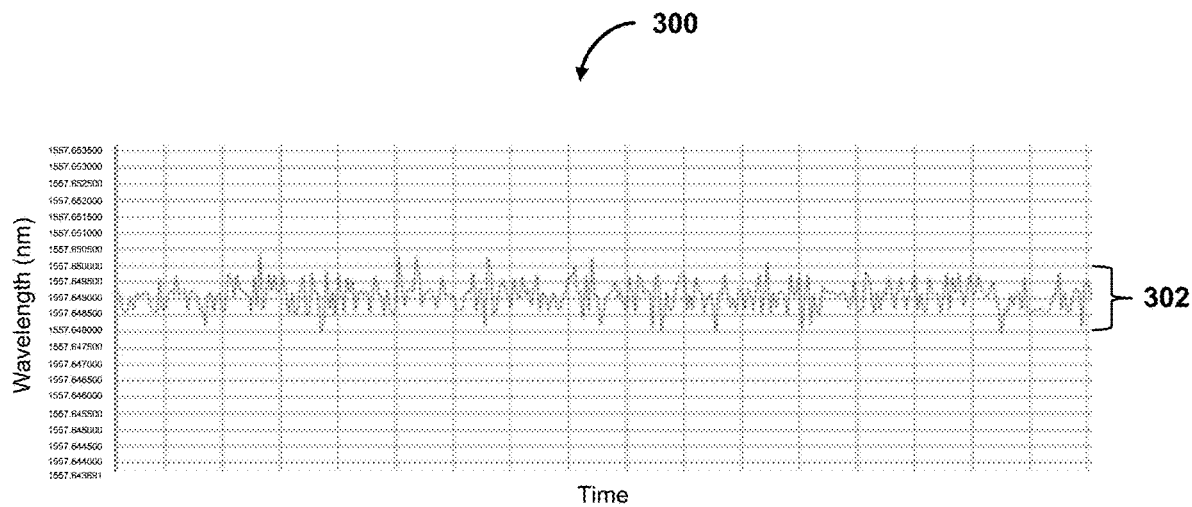
FIGS. 3A and 3B show wavelength readings from sensors, in accordance with one or more embodiments.
Figure 3B:
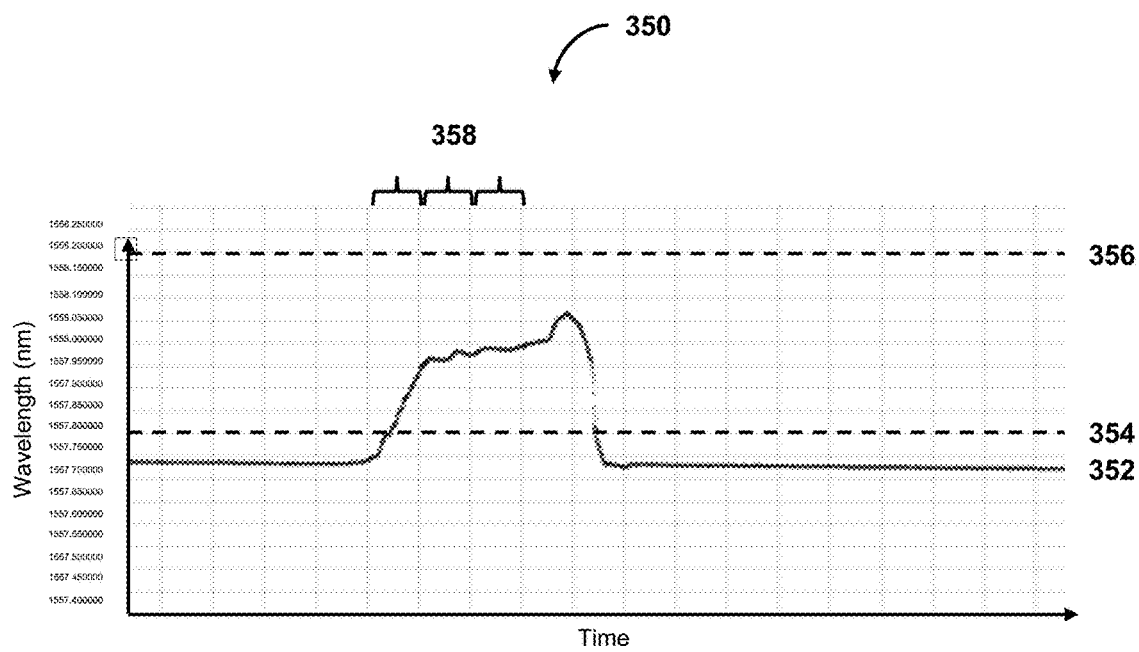

FIG. 3A illustrates a plurality of wavelength readings 300 from a sensor, in accordance with one or more embodiments. In some embodiments, wavelength readings 300 may be measured by an optical controller (e.g., sensing component 204 in FIG. 2A) working in conjunction with the sensor (e.g., optical sensor 252, as shown in FIG. 2B, and/or sensors 208/210, as shown in FIG. 2A). For example, the optical controller (e.g., sensing component 204 in FIG. 2A) may send a laser down a fiber to an FBG sensor (e.g., optical sensor 252 and/or sensors 208/210). The FBG sensor may reflect laser light back to the optical controller. The optical controller may then read the reflected light and send the wavelength and amplitude readings to computer system 102 and/or compute component 202 for processing. FIG. 3A illustrates wavelength readings in an initial state (e.g., with no applied strain or vibration), whereas FIG. 3B illustrates wavelength readings when a strain or vibration is detected. In some embodiments, wavelength readings 300 may be received from a sensor 142 (as shown in FIG. 1), sensor system 200 (as shown in FIG. 2A), or sensor system 250 (as shown in FIG. 2B). In some embodiments, wavelength readings 300 may correspond to wavelength readings 212, as shown in FIG. 2A. Computer system 102 (e.g., event detection subsystem 112) may determine a normal state of the sensor 142 based on the obtained plurality of wavelength readings.

For example, each sensor 142 may be initialized and a plurality of wavelength readings may be obtained (e.g., via data collection subsystem 148 and communication subsystem 144) from each sensor 142. In some embodiments, during the initialization phase, wavelength readings from a sensor 142 may be added to a queue of readings. Computer system 102 may monitor the queue of wavelength readings to determine if the queue is full and may remain in the initialization phase until the queue has filled. In some embodiments, the queue size may be predetermined, set by computer system 102, set by a user, or determined in another way. In some embodiments, computer system 102 may begin event detection once the initialization phase is complete. In some embodiments, once computer system 102 determines that the queue is full, computer system 102 may move from the initialization phase to an event detection phase (e.g., as discussed in detail below). The initialization phase may correspond to a phase in which no strain or vibration is applied to the sensors 142 and the wavelength readings are obtained from such sensors 142 (e.g., via data collection subsystem 148 and communication subsystem 144).

Based on the plurality of wavelength readings received during the initialization phase, adjustment subsystem 110 may determine a normal state including a centerline wavelength, an upper wavelength threshold, and a lower wavelength threshold for each sensor 142 in a normal state. In some embodiments, the centerline wavelength may be a specific wavelength to which a sensor has been manufactured. In some embodiments, adjustment subsystem 110 may continuously update the centerline wavelength based on information (e.g., readings) collected from sensors 142, in order to account for changes in sensors 142 over time (e.g., due to fatigue, environmental factors, etc.). As an example, adjustment subsystem 110 may determine a centerline wavelength to be a mean, median, or mode of the plurality of wavelength readings. For example, the centerline wavelength may be an average of the wavelength readings received during the initialization phase.

In some embodiments, the upper and lower wavelength thresholds may be determined based on one or more factors (e.g., the value of the largest wavelength reading, the value of the smallest wavelength reading, any multiplier of the largest wavelength reading or the smallest wavelength reading, a standard deviation (e.g., one standard deviation, two standard deviations, three standard deviations, etc.) associated with the plurality of wavelength readings, or any multiplier of the standard deviation associated with the plurality of wavelength readings). In some embodiments, the wavelength readings may be associated with a time stamp and wavelength readings that are more recent may be associated with a higher weight than wavelength readings that are older. Accordingly, the centerline wavelength and the upper and lower wavelength thresholds may be determined based on the values associated with the plurality of wavelength readings and the weights associated such wavelength readings. In some embodiments, the weights may be dynamic. In other words, the weights associated with each of the plurality of readings may vary with time. As shown in FIG. 3A, a plurality of wavelength readings 302 may represent wavelength readings obtained in an initialization phase and such wavelength readings may be used to determine the normal state of the sensor 142 (e.g., including a centerline wavelength, an upper wavelength threshold, and a lower wavelength threshold for the sensor 142). The measured wavelengths of a sensor 142 may vary based on reflection from cable connections, vibrations, and strain to environmental factors such as temperature.

In some embodiments, after the initialization phase of the sensors 142, computer system 102 may continuously obtain a plurality of wavelength readings from the sensor 142 (e.g., via data collection subsystem 148 and communication subsystem 144). Further, computer system 102 (e.g., adjustment subsystem 110) may continuously adjust a normal state of the sensor 142 based on wavelength readings of the plurality of wavelength readings that fail to satisfy both upper and lower wavelength thresholds of the continuously-adjusted normal state. In other words, the adjustment subsystem 110 may only utilize the wavelength readings that fall between the upper and lower wavelength thresholds in order to adjust the normal state of the sensor 142 (e.g., in order to adjust the centerline wavelength, upper wavelength threshold, and/or lower wavelength threshold). In some embodiments, this may avoid the inclusion of events (e.g., disturbances near sensors 142 that cause the wavelength readings to exceed the upper wavelength threshold or fall below the lower wavelength threshold) in the adjustment of the normal state. For example, in some embodiments, the centerline wavelength may be a dynamic average of the wavelength readings that are continuously obtained and which fall between the upper and lower wavelength thresholds.

It is advantageous to continuously adjust the normal state for various reasons. As an example, the sensitivity of the sensors may deteriorate over time and the normal state may need to be adjusted in order to properly detect an event. As another example, due to external factors (e.g., vibration of an A/C unit), sensors 142 may detect vibrations (e.g., continuous vibrations) and accordingly the plurality of wavelength readings may vary. As another example, environmental factors such as temperature can cause wavelength readings to vary over time. As such, it is advantageous to continuously determine and adjust the normal state of the sensor 142 in order to reduce false positive sensor alerts. Continuously adjusting the normal state of the sensor 142 may include continuously adjusting a centerline wavelength, the upper wavelength threshold, and the lower wavelength threshold associated with the sensor 142.

FIG. 3B illustrates a plurality of wavelength readings 350 from a sensor, in accordance with one or more embodiments. As shown in FIG. 3B, one or more wavelength readings 352 exceed an upper wavelength threshold 354. In some embodiments, upper wavelength threshold 354 (or a lower wavelength threshold) may represent a threshold past which computer system 102 may begin to calculate a number of wavelength readings that satisfy the upper wavelength threshold 354 (e.g., that exceed the upper wavelength threshold 354) or satisfy a lower wavelength threshold (e.g., that falls below the lower wavelength threshold). FIG. 3B also illustrates a maximum wavelength threshold 356 associated with a sensor 142. In some embodiments, each sensor 142 may be associated with corresponding upper and lower wavelength thresholds and maximum and minimum wavelength threshold limits.

In some embodiments, the maximum and minimum wavelength threshold limits of sensors 142 may be limited by manufacturer of the sensors 142 (e.g., the sensors 142 may be built such that they can detect wavelengths within maximum and minimum wavelength threshold limits). The maximum and minimum wavelength threshold limits (e.g., maximum wavelength threshold 356) for sensors 142 may be vary based on the type of sensors, manufacture specifications, or other attributes of sensors 142. In some embodiments, maximum and minimum threshold limits may be determined via calculations. For example, maximum and minimum threshold limits may be determined by stepping on a sensor and measuring the resulting wavelength(s).

In some embodiments, the upper and lower wavelength thresholds may be determined and adjusted based on wavelength measurements, based on the continuous adjustment of the centerline wavelength, or based on other factors. For example, the upper and lower wavelength thresholds may be determined by computer system 102 based on variability of wavelength readings during the initialization phase. For example, computer system 102 may determine upper and lower wavelength thresholds based on maximum and minimum wavelength readings obtained during the initialization phase, during normal use, or during another time period. In some embodiments, upper and lower wavelength thresholds may be set based on such variability. For example, the upper and lower wavelength thresholds may be set such that they are greater than typical wavelength variability to avoid false positives. For example, typical wavelength variability may correspond to wavelength readings that fall within maximum and minimum wavelength readings (e.g., obtained during the initialization phase, during normal use, or during another time period). In some embodiments, upper and lower wavelength thresholds may be adjusted to control sensitivity of sensors 142. For example, in environments having high strain levels or high vibration levels, upper and lower wavelength thresholds may be increased for a specific sensor. This may prevent a sensor from triggering false positive alarms due to environmental impact. In some embodiments, the centerline wavelength may also be adjusted based on a plurality of readings obtained from a sensor 142. For example, the centerline wavelength may be adjusted to control sensitivity of sensors 142. For example, in environments having high strain levels or high vibration levels, the mean (median or mode) of the plurality of readings may increase for a specific sensor.

In some embodiments, event detection subsystem 112 may detect an event when one or more wavelength readings satisfy the upper or lower wavelength thresholds of the continuously-adjusted normal state. In other words, event detection subsystem 112 may detect an event when one or more wavelength readings exceed the upper wavelength threshold or fall below the lower wavelength threshold of the continuously-adjusted normal state. For example, computer system 102 (e.g., event detection subsystem 112) may analyze wavelength readings 352 in time slices (e.g., time slices 358). In some embodiments, time slices 358 may have a fixed length (e.g., one second, two seconds, five seconds, etc.). Event detection subsystem 112 may identify a time slice during which one or more wavelength readings 352 cross the upper wavelength threshold 354. In some embodiments, event detection subsystem 112 may identify each time slice during which wavelength reading 352 remains above upper wavelength threshold 354. In some embodiments, one or more time slices during which a wavelength reading 352 crosses or is above upper wavelength threshold 354 may correspond to an event. In some embodiments, an event may be detected when one wavelength reading during a single time slice 358 exceeds the upper wavelength threshold 354, when a plurality of wavelength readings (e.g., a threshold number of a plurality of readings) during a single time slice 358 exceed the upper wavelength threshold 354, and/or when a plurality of readings (e.g., a threshold number of a plurality of readings) during a plurality of time slices 358 (e.g., during a threshold number of a plurality of consecutive time slices 358) exceed upper wavelength threshold 354.

In some embodiments, event detection subsystem 112 may identify each time slice during which one or more wavelength readings 352 are below a lower wavelength threshold. In some embodiments, one or more time slices during which wavelength reading 352 crosses or is below the lower wavelength threshold may correspond to an event. In some embodiments, an event may be detected when one wavelength reading during a single time slice 358 falls below the lower wavelength threshold, when a plurality of wavelength readings (e.g., a threshold number of a plurality of readings) during a single time slice 358 fall below the lower wavelength threshold, and/or when a plurality of readings (e.g., a threshold number of a plurality of readings) during a plurality of time slices 358 (e.g., during a threshold number of a plurality of consecutive time slices 358) fall below the lower wavelength threshold. In other words, computer system 102 (e.g., event detection subsystem 112) may identify or detect an event when one or more wavelength readings during a time slice satisfy the upper or lower wavelength threshold.

In some embodiments, when one or more wavelength readings satisfy the upper or lower wavelength thresholds of the continuously-adjusted normal state, computer system 102 may send one or more messages to a central server (e.g., an infrastructure monitoring system). For example, a message may include one or more wavelength readings (e.g., wavelength readings that satisfy the upper or lower wavelength thresholds of the continuously-adjusted normal state) for processing. In some embodiments, a message may include all wavelength readings within a certain time period. For example, a message may include all consecutive wavelength readings that satisfy the upper or lower wavelength thresholds of the continuously-adjusted normal state. The central server may process the wavelength readings included in the message in order to determine information about the detected event. In another example, a message may include an alert indicating a detected event. For example, the central server may have access to other systems and data which may provide context to the detected event or the central server may include systems for playback of a detected event indicated by a message. Although a central server is noted above, it should be understood that the computer system 102 may perform all functions of a central server.

In some embodiments, several comparisons may be performed (e.g., by computer system 102, a central server, or another processor) on received wavelength readings that satisfy the upper or lower wavelength thresholds of the continuously-adjusted normal state in order to determine information about the detected event (e.g., disturbance or activity). For example, computer system 102 (e.g., event detection subsystem 112) may compare current wavelength readings to the upper wavelength threshold and lower wavelength threshold to determine if the wavelength readings are rising or falling. This may allow computer system 102 to determine wave direction. In some embodiments, event detection subsystem 112 may determine, for each of the one or more wavelength readings that satisfies the upper wavelength threshold, a first magnitude of a difference between the wavelength reading and a centerline wavelength of the continuously-adjusted normal state. Event detection subsystem 112 may also obtain or determine a second magnitude of a difference between a maximum threshold limit or minimum threshold limit associated with the sensor 142 and the centerline wavelength. For example, if the wave is determined to be rising, the first magnitude (e.g., a difference between the wavelength reading and the centerline wavelength) may be compared to the second magnitude (e.g., a difference between a maximum threshold limit (e.g., maximum wavelength threshold 356) and the centerline wavelength). If the wave is determined to be falling, the first magnitude (e.g., a difference between the wavelength reading and the centerline wavelength) may be compared to the second magnitude (e.g., a difference between a minimum threshold limit and the centerline wavelength). Each sensor 142 may have a maximum and a minimum threshold limit associated with the sensor, as discussed above.

In some embodiments, event detection subsystem 112 may determine a ratio between the first magnitude and the second magnitude. The ratio may indicate a distance of the occurrence of the event from the sensor 142. In other words, a distance of the occurrence of the event from the sensor 142 may be determined based on the determined ratio. In some embodiments, the ratio between the first magnitude and the second magnitude may be inversely proportional to the distance of the occurrence of the event from the sensor. In other words, a smaller ratio would indicate a larger distance of the occurrence of the event from the sensor 142 and a larger ratio would indicate a smaller distance of the occurrence of the event from the sensor 142. In some embodiments, a location of the occurrence of the event may be identified based on the determined distance (e.g., the determined distance of the occurrence of the event from the sensor 142) and based on a location of the sensor 142. The location of the sensor 142 may be known and may be stored in the database 132. The database 132 may also store wavelength readings and the continuously adjust the normal state. The wavelength readings may also be stored in a buffer of computer system 102 for a predetermined amount of time (e.g., to be used in calculations at a later time). The database 132 may store any data described in this disclosure.

In some embodiments, a maximum of one event per second may be detected. In some embodiments, each event may represent all associated calculations that are generated during the event (e.g., first magnitude, second magnitude, ratio, distance, etc.). In some embodiments, an event may correspond to an interaction (e.g., of a person or object) in close proximity to a floor sensor (e.g., sensor system 200, as shown in FIG. 2A, or sensor system 250, as shown in FIG. 2B). In some embodiments, an event may be detected by computer system 102 (e.g., event detection subsystem 112) when one or more wavelength readings from the sensor satisfy the upper or lower wavelength thresholds of the continuously-adjusted normal state (e.g., as described above). In other words, an event may be detected when one or more wavelength readings exceed an upper wavelength threshold (e.g., upper wavelength threshold 354) or fall below a lower wavelength threshold.

In some embodiments, based on a detected event, a number of wavelength readings that satisfy the upper or lower wavelength thresholds may be determined by computer system 102 (e.g., event detection subsystem 112). As an example, a number of wavelength readings that are above the upper wavelength threshold for a threshold amount of time, a number of consecutive wavelength readings that are above the upper wavelength threshold, a number of wavelength readings that are below the lower wavelength threshold for a threshold amount of time, or a number of consecutive wavelength readings that are below the lower wavelength threshold may be determined. The number of wavelength readings may correspond to a number of changes (e.g., a number of consecutive changes) in the wavelength readings that are above the upper wavelength threshold or below the lower wavelength threshold for a threshold amount of time.

In some embodiments, a duration of the detected event occurring at or near the sensor may be determined by event detection subsystem 112 based on the number of wavelength readings (e.g., or a number of time slices for wavelength readings) that exceed the upper wavelength threshold (or fall below the lower wavelength threshold). In some embodiments, the number of wavelength readings that exceed the upper wavelength threshold (or fall below the lower wavelength threshold) or a number of time slices during which one or more wavelength readings exceed the upper wavelength threshold (or fall below the lower wavelength threshold) may be directly proportional to the duration of the event occurring at or near the sensor. In other words, a higher number of wavelength readings that exceed the upper wavelength threshold (or fall below the lower wavelength threshold) or a higher number of time slices during which one or more wavelength readings exceed the upper wavelength threshold (or fall below the lower wavelength threshold) may indicate a longer duration of occurrence of the event and a smaller number of wavelength readings that exceed the upper wavelength threshold (or fall below the lower wavelength threshold) or a smaller number of time slices during which one or more wavelength readings exceed the upper wavelength threshold (or fall below the lower wavelength threshold) may indicate a shorter duration of occurrence of the event.

In some embodiments, event detection subsystem 112 may adjust the rate at which wavelength readings are obtained from sensor 142 or a rate at which the sensors 142 read. Such adjustment may be based on the number of the one or more wavelength readings that satisfy the upper or lower wavelength thresholds. As an example, the rate may be increased when the number of the one or more wavelength readings exceeds the predetermined count threshold. Event detection subsystem 112 may adjust the rate back to its initial value when the number of the one or more wavelength readings does not exceed the predetermined count threshold. This adjustment of rate may be continuous.

In some embodiments, computer system 102 (e.g., event detection subsystem 112) may generate an alert when the number of wavelength readings (e.g., wavelength readings that satisfy an upper or lower wavelength threshold) satisfies a predetermined count threshold. In other words, when the number of wavelength readings that exceed the upper wavelength threshold or fall below the lower wavelength threshold is equal to or greater than a predetermined count threshold, an alert may be generated. The alert may indicate an occurrence of a suspicious event. By generating an alert when wavelength readings exceed the upper wavelength threshold (or fall below the lower wavelength threshold) and when the number of the wavelength readings that exceed the upper wavelength threshold (or fall below the lower wavelength threshold) is equal to or greater than a predetermined count threshold, the system 100 may reduce false positive sensor alerts. In other words, event detection subsystem 112 may detect an event when a wavelength reading exceeds the upper wavelength threshold (or falls below the lower wavelength threshold). However, such an event may not be associated with suspicious activity. For example, if a fixture from a ceiling falls on a floor, the sensor 142 may detect an event because the wavelength reading may exceed the upper wavelength threshold (or may fall below the lower wavelength threshold). However, such an event may not trigger an alert (e.g., a suspicious activity alert).

As shown in FIG. 3B, wavelength reading 352 exceeds upper wavelength threshold 354 for a certain number of wavelengths. For example, each one-second time slice (e.g., time slices 358) may comprise at least one reading and, in some embodiments, readings may be generated, collected (e.g., via data collection subsystem 148), and sent to computer system 102 (e.g., via communication subsystem 144) at a rate of 200-500 readings per second. Event detection subsystem 112 may compare a number of readings that exceed wavelength threshold 354 with a predetermined count threshold. In some embodiments, an alert may only be generated when the number of the wavelength readings that exceed the upper wavelength threshold (or fall below the lower wavelength threshold) is equal to or greater than a predetermined count threshold. This may reduce false positive sensor alerts. In this example, event detection subsystem 112 may determine that the predetermined count threshold (e.g., 2,500 readings) has not been exceeded and may not generate an alert. In some embodiments, if event detection subsystem 112 determines that the predetermined count threshold has been exceeded, a generated alert may be presented via a user interface of computer system 102 (e.g., presentation subsystem 116). The sensor system 104a may include a display subsystem 146. Display subsystem 146 may light up (e.g., using LEDs or other lighting mechanism) to generate an alert with respect to a particular sensor. For example, each sensor 142 may include a light source that lights up when the sensor 142 detects an event.

In some embodiments, a sensor may "clear" an event or otherwise indicate that an event has ended. For example, computer system 102 may output a message, change a color of one or more sensors, or emit a sound (e.g., via presentation subsystem 116) to indicate that the event has ended. In some embodiments, failure of a sensor to "clear" after an initialization phase may indicate that an upper wavelength threshold (e.g., upper wavelength threshold 354, as shown in FIG. 3B) or a lower wavelength threshold may be set incorrectly (e.g., too sensitive).

In some embodiments, system 100 may utilize the data received from various sensors and other sources in order to further reduce false positive alerts. For example, system 100 may determine that an employee badge was scanned at a location near a detected event and that the employee badge belonged to authorized personnel. In some embodiments, system 100 may apply facial recognition techniques to video footage received from a camera sensor in order to identify personnel in a location. System 100 may determine that the detected event is not suspicious based on the recognition of authorized personnel. In some embodiments, system 100 may retrieve a history of events associated with a person in the vicinity of a detected event. For example, if a person often triggers floor sensors (e.g., due to handling or dropping heavy objects), the system may determine that the detected event is not suspicious. In another example, system 100 may cross reference the timeline and location of a detected event with planned maintenance. If the detected event occurred at a location and during a scheduled time of planned maintenance, system 100 may determine that the detected event is not suspicious. In another example, system 100 may determine a function of the location at which the event was detected. For example, if the location is a work space, system 100 may disregard certain events that are detected during work hours. In another example, system 100 may cross reference a detected event with weather data from the time of the detected event. If system 100 determines that severe weather occurred at the time of the event, system 100 may determine that the detected event is not suspicious.

In some embodiments, system 100 may train or configure a prediction model to facilitate generation of a sensor alert. In some embodiments, the prediction model may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free flowing, with connections interacting in a more chaotic and complex fashion.

In some embodiments, the prediction model may update its configurations (e.g., weights, biases, or other parameters) based on its assessment of the predictions. The database 132 may include training data and one or more trained prediction models.

Figure 4:
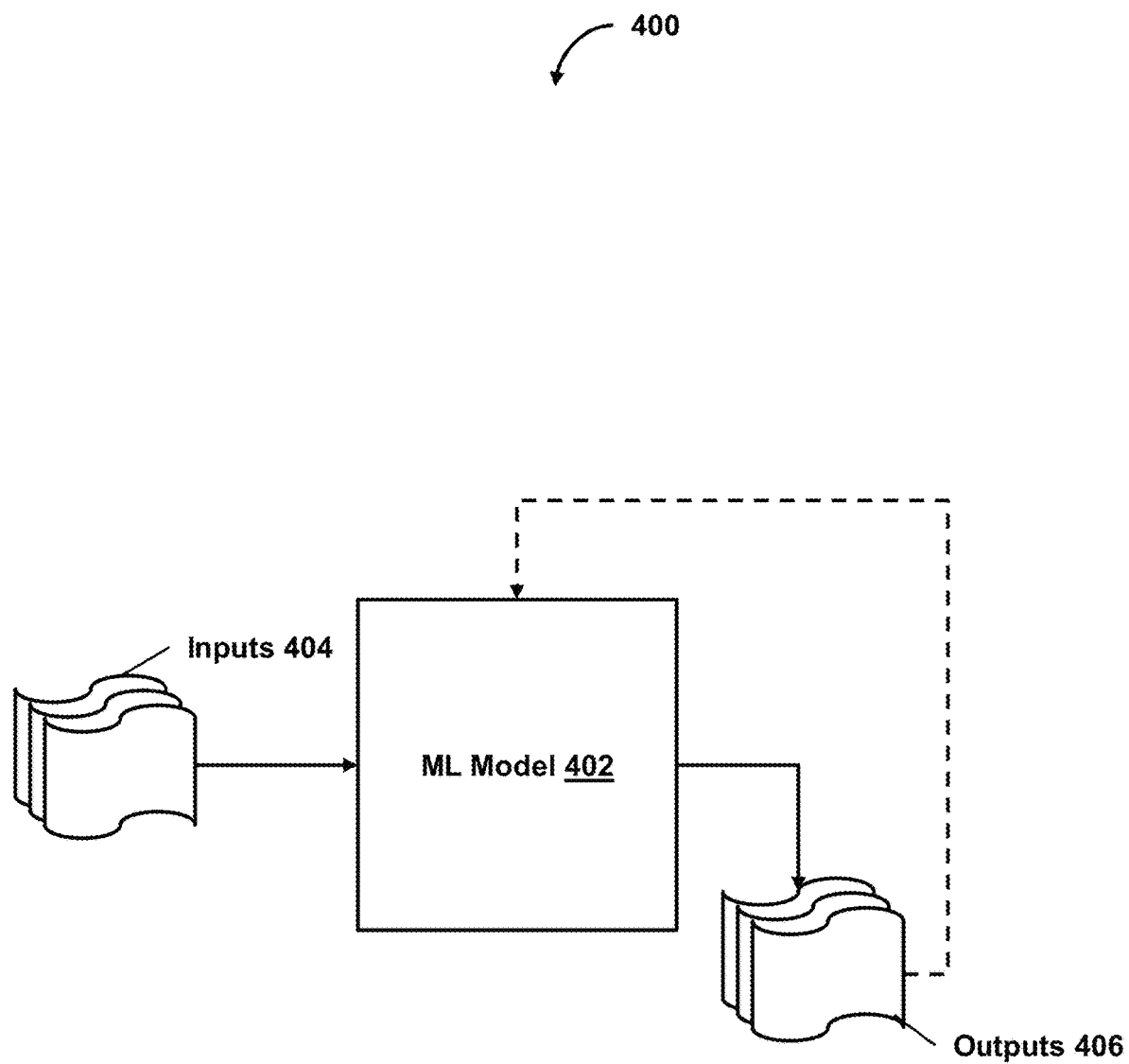
FIG. 4 shows a machine learning model configured to facilitate generation of a sensor alert, in accordance with one or more embodiments.

FIG. 4 shows a machine learning model 400 configured to facilitate generation of a sensor alert, in accordance with one or more embodiments. For example, machine learning model 402 may take inputs 404 and provide outputs 406. For example, inputs 404 may include wavelength readings from sensors (e.g., sensors 142, as shown in FIG. 1). In some embodiments, the wavelength readings may correspond to detected strain, no detected strain, an event, or some other state of the sensors. In some embodiments, outputs 406 may include predicted sensor alerts (e.g., including non-alert responses). For example, outputs 406 may include various alert type predictions based on the wavelength readings. In one use case, outputs 406 may be fed back (e.g., active feedback) to machine learning model 402 as input to train machine learning model 402 (e.g., alone or in conjunction with user indications of the accuracy of outputs 406, labels associated with the inputs, or with other reference feedback information). In another use case, machine learning model 402 may update its configurations (e.g., weights, biases, or other parameters) based on its assessment of its prediction (e.g., outputs 406) and reference feedback information (e.g., user indication of accuracy, reference labels, or other information). In another use case, where machine learning model 402 is a neural network, connection weights may be adjusted to reconcile differences between the neural network's prediction and the reference feedback. In a further use case, one or more neurons (or nodes) of the neural network may require that their respective errors be sent backward through the neural network to them to facilitate the update process (e.g., backpropagation of error). Updates to the connection weights may, for example, be reflective of the magnitude of error propagated backward after a forward pass has been completed. In this way, for example, the machine learning model 402 may be trained to generate better predictions.

Real-Time Playback Modification for Activity Event Playback

In some embodiments, computer system 102 (e.g., event detection subsystem 112) may compile information from multiple sources in order to assess a detected event. For example, event detection subsystem 112 may take into account wavelength readings and generated alerts from sensor system 104a and computer system 102, feeds from visual sensors (e.g., cameras) located in and around the infrastructure, other sensor data (e.g., cable tray sensors and temperature, air quality, and moisture sensors), location specific data (e.g., work orders, hours of operation), spatial specific data (e.g., locations of key assets), intrusion sensor data, access control data (e.g., data obtained via sensors that allow access to a venue or infrastructure), weather data, and other received data. Computer system 102 may use all received data in order to contextualize triggered alerts (e.g., based on readings from sensors 142). In some embodiments, computer system 102 may override triggered alerts or may initiate emergency protocol based on all received data. In some embodiments, data received by computer system 102 may cause adjustment subsystem 110 to adjust normal states and wavelength thresholds associated with sensors 142 (e.g., based on data indicating that standard environmental factors triggered the alert). In some embodiments, computer system 102 may use all available data to continuously adjust the normal state of the sensors 142 to reduce the occurrence of false positive alerts.

Figure 5A:
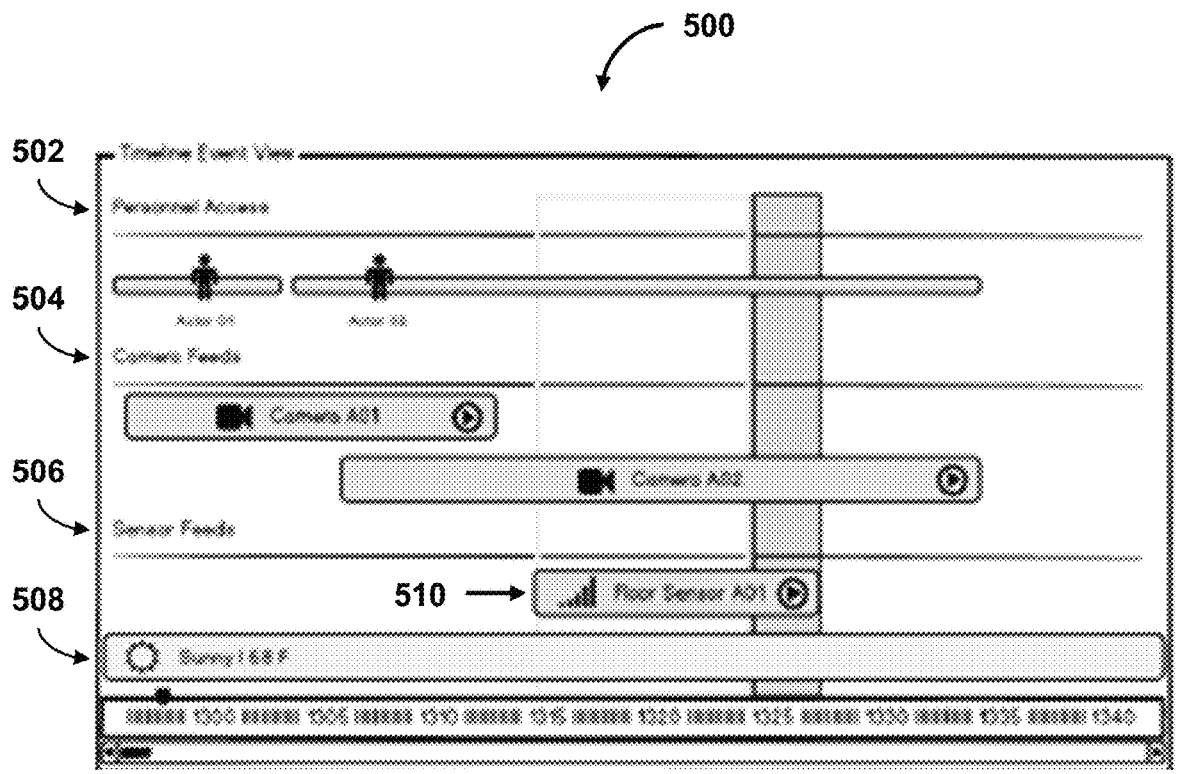
FIGS. 5A, 5B, and 5C show user interfaces for monitoring multiple sources of information, in accordance with one or more embodiments.
Figure 5B:
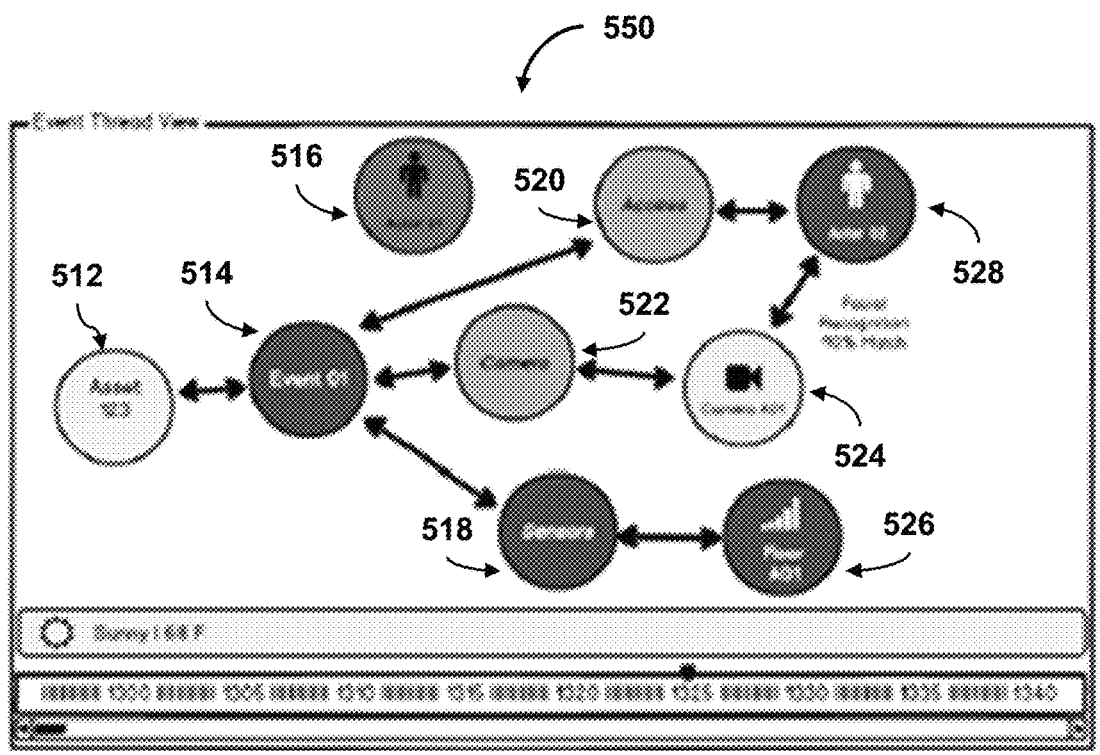

In some embodiments, computer system 102 (e.g., user interaction subsystem 118) may provide one or more user interface for monitoring these various sources of information. For example, FIGS. 5A and 5B show user interfaces for monitoring multiple sources of information, in accordance with one or more embodiments. In some embodiments, computer system 102 may obtain data (e.g., such as the data shown in FIGS. 5A and 5B) from one or more sources (e.g., from a camera feed, from sensors 142, etc.). As shown in FIG. 5A, user interface 500 may show a timeline view of multiple streams of data. For example, user interface 500 may show access information 502 for one or more personnel, one or more camera feeds 504, one or more sensor feeds 506, or other information 508 (e.g., weather data). In some embodiments, user interface 500 may show how the streams of data relate to each other with respect to time. For example, for an event that is displayed in the sensor feed 506 (e.g., by a floor sensor 510), user interface 500 may show a camera feed 504 having recordings for the time period of the event. In some embodiments, computer system 102 may additionally have spatial information for camera feeds 504 and sensor feeds 506 (e.g., which cameras are pointed at the areas surrounding the sensors). Therefore, computer system 102 may retrieve the data (e.g., via data collection subsystem 148 and communication subsystem 144) recorded by the camera (e.g., camera feeds 504) in order to gain more information about the event detected by the floor sensor (e.g., sensor feeds 506).

As shown in FIG. 5B, user interface 550 may show an event thread view, which may correlate disturbance data with spatial information (e.g., asset 512, floor 526), one or more cameras (e.g., camera 522, camera 524), one or more sensors (e.g., sensors 518), access information (e.g., access 520), personnel information (e.g., actor 516, actor 528), and other information.

Figure 5C:
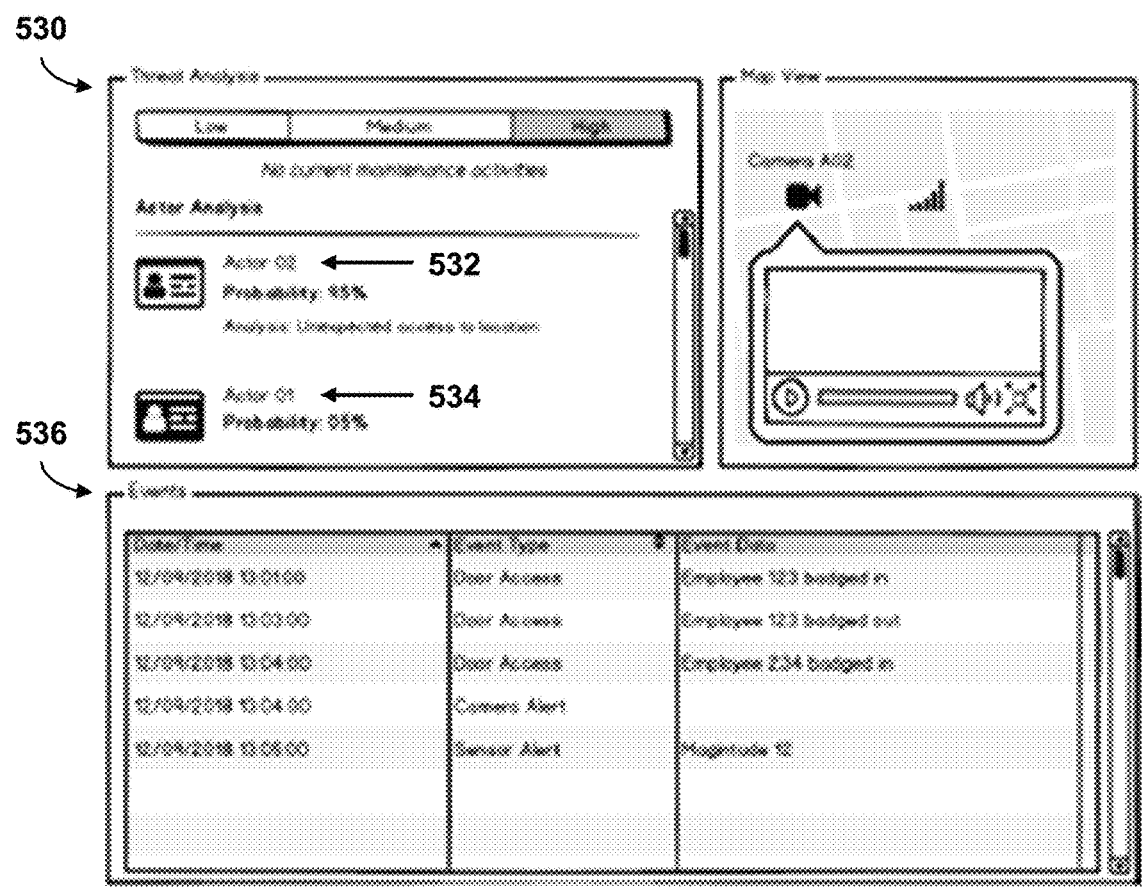

In some embodiments, both user interface 500 and user interface 550 may contribute to the computation of a threat likelihood of an event. For example, computer system 102 (e.g., event detection subsystem 112) may determine a likelihood that one or more personnel detected in a location is a threat based on the information provided by user interface 500 and user interface 550. As shown in FIG. 5C, user interface 575 may show a threat analysis 530. For example, if a first person (e.g., actor 532) is detected in a location to which they do not have personnel access, event detection subsystem 112 may calculate a high probability (e.g., 95%) that the person is a threat. If a second person (e.g., actor 534) is detected in a location to which they have personnel access, event detection subsystem 112 may calculate a low probability (e.g., 5%) that the person is a threat. In some embodiments, factors which may contribute to a high probability of a threat may include who is in a location, who has access to the location, a history of people who have been in the location, whether a disturbance in the location was expected (e.g., due to planned maintenance), if the disturbance was triggered by a person or some other cause, and other factors. The threat analysis 530 may rely in part on a listing of events 536. The listing of events 536 may list date and time information, event type information, and event data (e.g., personnel information) relating to detected events. For example, event detection subsystem 112 may compare event information from event listing 536 to personnel access information (e.g., access information 502, as shown in FIG. 5A) or other information provided by user interface 500 and user interface 550 in order to perform the threat analysis.

In some embodiments, computer system 102 may output (e.g., via presentation subsystem 116) an alert indicating a suspected threat, a predicted event, or other information. For example, as discussed above in relation to FIG. 3B, computer system 102 (e.g., event detection subsystem 112) may detect an event based on wavelength readings that satisfy an upper or lower wavelength threshold. In some embodiments, computer system 102 may receive input from the user (e.g., via user interaction subsystem 118) in response to the alert. For example, the user may input a request to lock down a portion of a building in which the suspected threat or the predicted event are located. In some embodiments, the user may add or remove personnel access via user interaction subsystem 118. In some embodiments, the user may add or remove one or more camera feeds, one or more sensor feeds, one or more detectors, or may activate or deactivate other devices.

In some embodiments, system 100 may utilize the data received from various sensors, cameras, and other sources (as shown in FIGS. 5A and 5B) in order to further reduce false positive alerts. For example, system 100 may determine that an employee badge was scanned at a location near a detected event and that the employee badge belonged to authorized personnel. In some embodiments, system 100 may apply facial recognition techniques to video footage received from a camera sensor in order to identify personnel in a location. System 100 may determine that the detected event is not suspicious based on the recognition of authorized personnel. In some embodiments, system 100 may determine a history of events associated with a person in the vicinity of a detected event. For example, if a person often triggers events (e.g., due to handling or dropping heavy objects), the system may determine that the detected event is not suspicious. In another example, system 100 may cross reference the timeline and location of a detected event with planned maintenance. If the detected event occurred at a location and during a scheduled time of planned maintenance, system 100 may determine that the detected event is not suspicious. In another example, system 100 may determine a function of the location at which the event was detected. For example, if the location is a work space, system 100 may disregard events that are detected during work hours. In another example, system 100 may cross reference a detected event with weather data from the time of the detected event. If system 100 determines that severe weather occurred at the time of the event, system 100 may determine that the detected event is not suspicious.

Figure 6A:
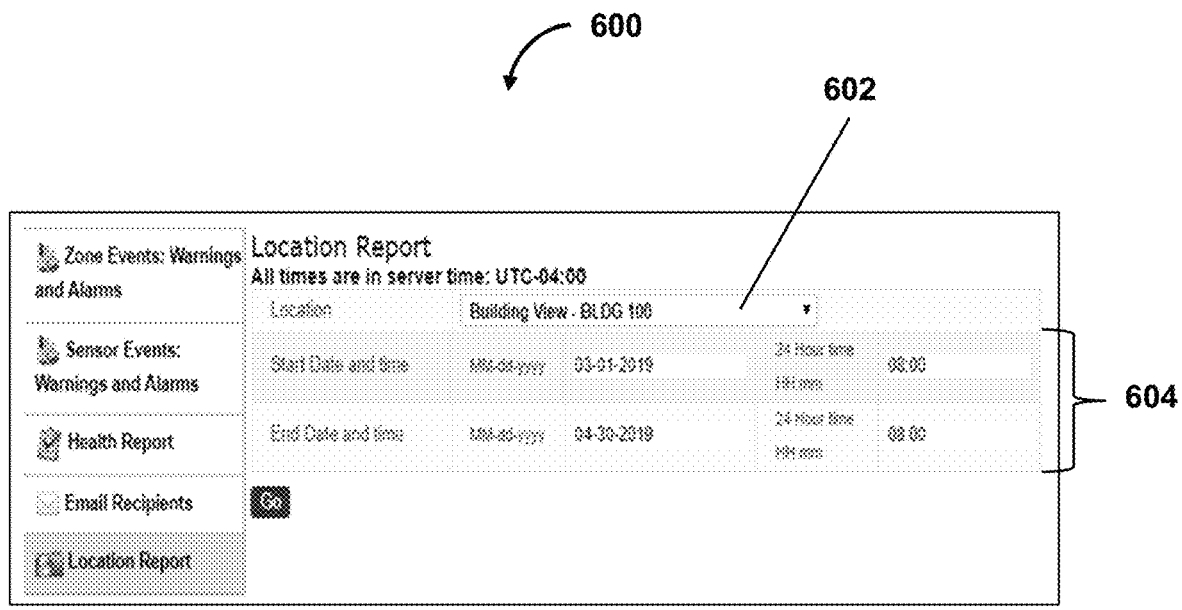
FIGS. 6A and 6B show user interfaces for user requests, in accordance with one or more embodiments.
Figure 6B:
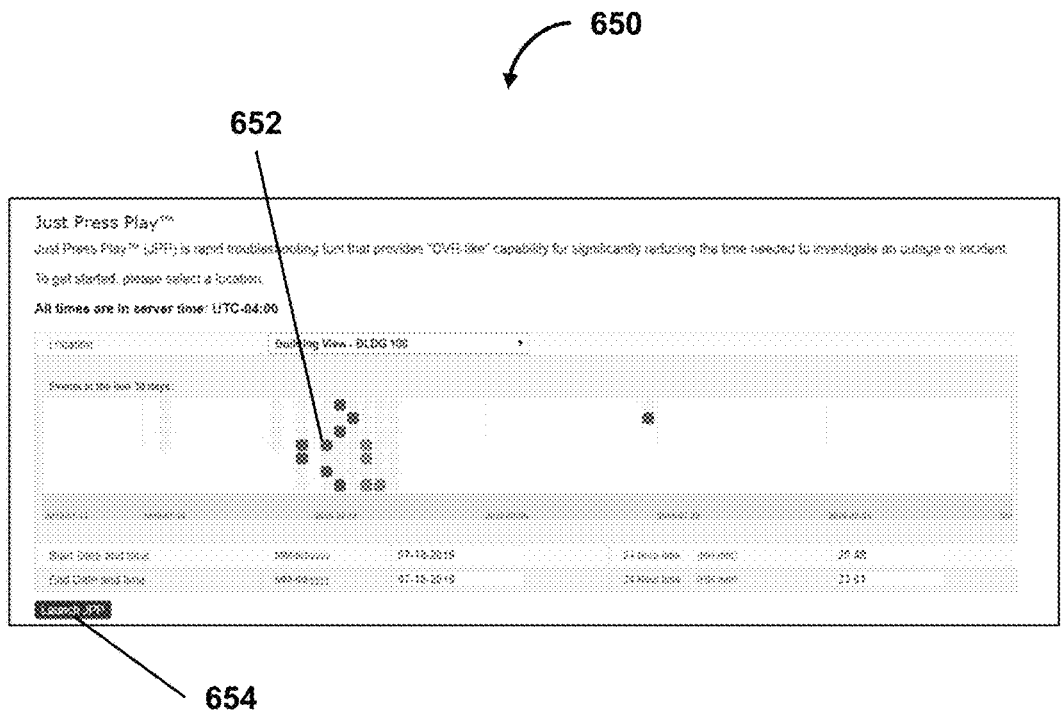

Returning to FIG. 1, system 100 may facilitate real-time playback modification for activity event playback. For example, system 100 may modify playback of events, alerts, feeds, and other assets depicted in FIGS. 5A and 5B. Computer system 102 (e.g., presentation subsystem 116), in some embodiments, may provide a user interface (e.g., via presentation subsystem 116 and user interaction subsystem 118) for modifying activity event playback. In some embodiments, computer system 102 may receive a user request (or query) via a user interface. For example, FIGS. 6A and 6B show user interfaces 600 and 650 for a user request, in accordance with one or more embodiments. In some embodiments, the user can request presentation of a listing of events via user interface 600. In a user request (or query), the user may indicate a location (e.g., location 602) of interest (e.g., from a drop down menu, by selecting items from a checklist, by typing a location identifier, or through another input method). The user may also indicate a time and date (e.g., time and date range 604) of interest. In some embodiments, computer system 102 may retrieve (e.g., from the database 132) a listing of events that correspond to the user request and search criteria.

As shown in FIG. 6B, the user may request a replay of events via user interface 650. For example, user interface 650 may display a timeline corresponding to a timeline or date range (e.g., last thirty days) selected by the user (e.g., via user interaction subsystem 118). In some embodiments, the timeline may be displayed (e.g., via presentation subsystem 116) with selectable portions (e.g., selectable squares 652). In some embodiments, each square of selectable squares 652 may represent an event. In some embodiments, selectable squares 652 may be color coded (e.g., yellow for warnings, red for alarms, green for normal states, etc.). In some embodiments, the user may select one or more squares to set a start or end of events for replay. In some embodiments, the user may manually enter a start or end of events for replay. In some embodiments, the user may request playback of the selected events (e.g., by selecting the launch button 654). In some embodiments, other methods of selecting events for playback may be used.

Figure 7:
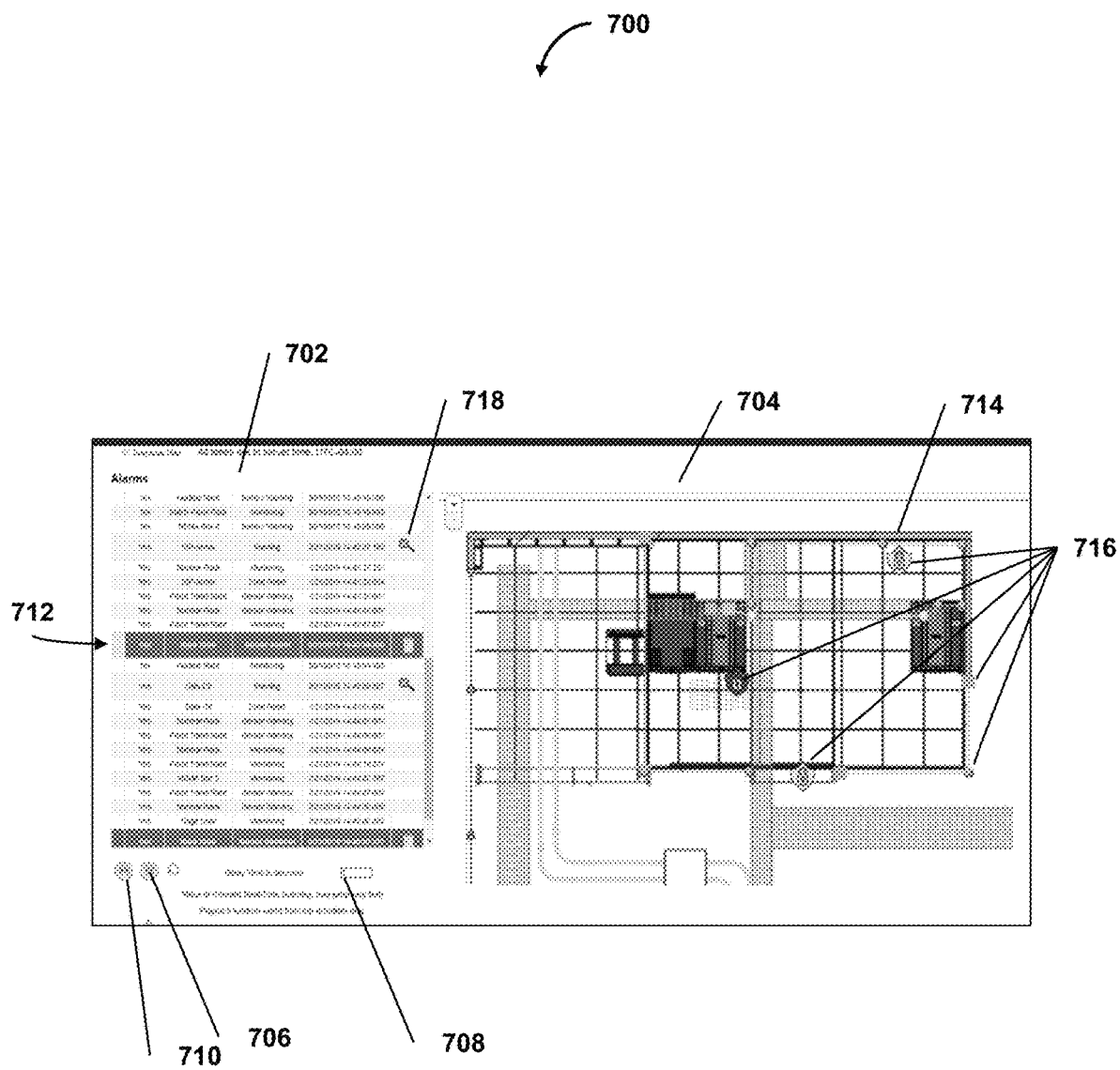
FIG. 7 shows a user interface for playback of events, in accordance with one or more embodiments.

In some embodiments, one or more events specified or selected by the user (e.g., via user interface 600 or user interface 650) may be played back via a user interface. The user interface may include a first portion and a second portion (or a window on the user interface may include a first portion and a second portion). The first portion may be configured to play back one or more events (e.g., one or more detected events by event detection subsystem 112 described above). As an example, FIG. 7 shows a user interface 700 for playback of events, in accordance with one or more embodiments. FIG. 7 illustrates a first portion 702 of the user interface that includes a listing of events. In some embodiments, the listing of events in the first portion 702 may correspond to events specified or selected by the user (e.g., via user interface 600 or user interface 650, as shown in FIGS. 6A and 6B). In some embodiments, the first portion 702 of the user interface 700 may provide additional information associated with the events. For example, the additional information associated with the events may include a category associated with each event of the set of events, a date and time associated with each event of the set events, or a location associated with each event of the set of events.

In some embodiments, the user interface may include a second portion 704, as illustrated in FIG. 7. The second portion 704 of the user interface may be configured to present playback of events in accordance with event detection times. For example, the first portion 702 of the user interface may present a listing of events based on a time and a location associated with the events. In other words, the set of events listed on the first portion 702 of the user interface may be based on times of detection of the events by one or more sensors 142 and locations of the events. In some embodiments, responsive to a selection of an action icon (e.g., action icon 706), playback may commence or continue. While playback of the set of events listed on the first portion 702 is occurring, the second portion 704 of the user interface may present a playback of events by overlaying a set of layers corresponding to the events onto the second portion 704 of the user interface. For example, the second portion 704 may overlay one layer for each event listed in the first portion 702. In some embodiments, a layer may include a location map. In other words, an event layer may include an illustration of an event on top of a location map such that a user viewing the overlaid layer may visualize the occurrence of the event at the location at which it occurred.

For example, as shown in FIG. 7, the second portion 704 includes a location map of infrastructure at a particular location. In some embodiments, event layers may be overlaid on top of this location map in order to demonstrate where certain events occurred relative to the infrastructure. In some embodiments, each event layer may correspond to an event listed in the first portion 702. In other words, each layer may correspond to one or more events related to activity alerts generated by sensors 142 (e.g., as shown in FIG. 1) based on event detection. For example, each event related to activity alerts generated by sensors 142 may be associated with a location and a time at which the event was detected. The event may then be mapped to a location on a location map of infrastructure (e.g., second portion 704). Based on this mapping, the event layers (associated with events) may be visually overlaid onto the location map. In some embodiments, a different event layer (associated with a different event) detected at a different location may be overlaid onto a different location map.

In FIG. 7, layer 714 corresponds to an event playback of event 712. In some embodiments, event 712 from the listing of events (e.g., in the first portion 702) may be highlighted while the corresponding layer 714 is being played. For example, the first portion 702 may highlight event 712 and the second portion 704 may simultaneously show all sensors 716 (e.g., floor sensors, rack door sensors, cable tray sensors, etc.) at a particular location associated with event 712 as well as the states associated with sensors 716 at the time of event 712. For example, second portion 704 may show sensors 716 having certain colors, in various states, monitoring certain contents (e.g., by weight or visually), generating alerts, or in other states. For example, the event layers may be color coded to indicate whether event 712 is suspicious. In other words, the sensors 716 may be illustrated in red if the event is determined to be suspicious or yellow if the event is determined not to be suspicious (e.g., based on the disclosure above). In some embodiments, the sensors 716 may be illustrated in green if no event was detected by the corresponding sensors 142 during the time period of the selected event. In some embodiments, the sensors 716 may blink or otherwise convey additional information (e.g., indicating that the sensors 716 are active).

In some embodiments, additional information may be provided during the presentation of event layer 714. For example, if a particular sensor (e.g., from sensors 716) is associated with a door (e.g., rack door), the playback may indicate whether the door was opened. For example, an icon (e.g., a lock icon) may be presented with the event layer 714 at a location corresponding to the location of a door sensor. The icon may change color, morph (e.g., into an open lock), or otherwise change to indicate that a door was opened. In some embodiments, the user may interact with (e.g., click, hover over, select) various areas of the user interface 700. Such user interaction allows additional information about the event to be overlaid on the first portion 702 or the second portion 704 of the user interface 700. This is advantageous because the user is provided with additional information about the event without leaving the current window or needing to go back and forth between different windows. For example, a user may interact with the illustration of sensors 716 in FIG. 7 in order to view additional information about the sensors 716 (e.g., which contents each sensor is monitoring, more details about the state of the sensor, etc.). In some embodiments, the user may interact with button 718 in order to view additional information about an event in the first portion 702. For example, an interaction with button 718 may cause additional information about the severity of an event to be displayed, including disturbance and movement information associated with a sensor during the time period of the event.

In some embodiments, while the event playback (e.g., of events listed in the first portion 702) is occurring via the second portion 704, a user selection of events may be obtained via user interface 700 (e.g., by user interaction subsystem 118). This real-time modification of playback improves upon the speed and efficiency of conventional systems. For example, enabling a user to select a subset of a listing of events during playback of the listing of events allows a user to quickly find and play back one or more events of interest without compromising playback. In other words, the real-time modification may allow the user to narrow in on a subset of events without stopping, exiting, or otherwise delaying playback. The increased efficiency of the methods and systems described herein may allow the user to more quickly identify a suspicious event and determine the cause of the event. The increased speed and efficiency of these methods and systems may allow the user to correct for a suspicious activity before the event becomes dangerous (e.g., to personnel or to property).

In some embodiments, a user may select a subset of events from the listing of events (e.g., first portion 702) to be presented in the playback via the second portion 704. In some embodiments, a user may select a first subset of events from the listing of events (e.g., first portion 702) that the user does not wish to be presented in the playback via the second portion 704 and a second subset of events from the listing of events (e.g., first portion 702) that the user wishes to be presented on the playback via the second portion 704. Although not shown in FIG. 7, a user may select the one or more events via a checkbox associated with each event listed on the first portion 702 of the user interface or may select from a drop-down list. The drop-down list may allow a user to select the one or more events based on, for example, a category associated with the one or more events. For example, a user may only be interested in the category "warning" and can select "warning" from a drop-down list such that one or more events associated with the category "warning" are selected to be presented via the second portion 704 of the user interface. In other words, the user selection indicates a second subset of events that the user wishes to playback via the user interface. Accordingly, the second subset of events may be presented via the second portion 704 of the user interface based on the user selection. In some embodiments, a size of a text associated with the subset of events may be increased in response to the user selection of the one or more events. In other words, a size of the text associated with the listing of events may be smaller than a size of the text associated with the subset of events. A size of text associated with the subset of events may be increased in proportion to a difference between a number of events in the entire set of events and a number of events in the subset of events. In some embodiments, the text associated with the listing of events may be wrapped around so that it fits within the first portion 702 of the user interface. In some embodiments, only a portion of the text associated with the event may be presented via the first portion 702 of the user interface. In response to a user selection (or, for example, in response to a user hovering the mouse over the event), the entire text corresponding to the event may be displayed by overlaying such text on the user interface.

In some embodiments, in response to a user selection of a subset of events for playback, during the playback, the set of layers associated with the listing of events (e.g., as described above) may be modified such that layers corresponding to the subset of events are added to the playback. In some embodiments, in response to a user selection of a first subset of events not to be presented in the playback and a second subset of events to be presented in the playback, the set of layers associated with the listing of events (e.g., as described above) may be modified such that layers corresponding to the first subset of events are removed from the event playback and layers corresponding to the second subset of events are added to the event playback. For example, layers corresponding to the second subset of events may be retrieved from database 132 and added to the event playback. In other words, layers that are associated with the first subset of events may be removed from the event playback such that the layers that are used for the event playback correspond to the second subset of events. The layers may be stored in a presentation buffer (not shown), for example, in database 132 and may be retrieved from the database 132 in response to a user request and search criteria discussed above. Accordingly, in response to the user selection of one or more events from the listing of events, the presentation buffer may be updated such that the presentation buffer includes the layers corresponding to the second subset of events. Computer system 102 (e.g., presentation subsystem 116) may cause the layers (corresponding to the subset of events) to be overlaid on the second portion 704 of the user interface. In some embodiments, updating the presentation buffer may include removing, from the presentation buffer, one or more layers corresponding to one or more events that are included in the set of events and excluded from the second subset of events or one or more layers corresponding to one or more events that are included in the first subset of events. This allows a user to playback the new set of layers relatively quickly after the user selection of one or more subsets of events from the listing of events because the entire presentation buffer does not need to be replaced in response to the user selection of one or more events.

In some embodiments, computer system 102 may cause the layers corresponding to the second subset of events to be overlaid on the second portion 704 of user interface 700, as shown in FIG. 7, based on the modification of the set of layers such that the second subset of events is presented or played back based on detection times associated with the second subset of events. For example, layers corresponding to the second subset of events may be overlaid onto the second portion 704 (e.g., over a location map) of the user interface 700. Each layer may correspond to a location map, and the location map for one layer may be different from a location map associated with another layer. In other words, a first layer presented on the second portion 704 of the user interface may correspond to a first event detected at a first time (e.g., detected by one or more sensors 142) and a second layer presented on the second portion 704 of the user interface may correspond to a second event detected at a second time (e.g., detected by one or more sensors 142), where the second time is after the first time.

In some embodiments, each layer may be overlaid on the second portion 704 of user interface 700 for a predetermined amount of time. For example, FIG. 7 illustrates a portion 708 via which a user may enter a time. Each layer may be overlaid on the second portion 704 of the user interface based on the user-entered time. In some embodiments, the user interface may include a rewind button 710 that will allow a previously overlaid layer to be overlaid again onto the second portion of the user interface in response to the user selection of the rewind button 710.

Figure 8:
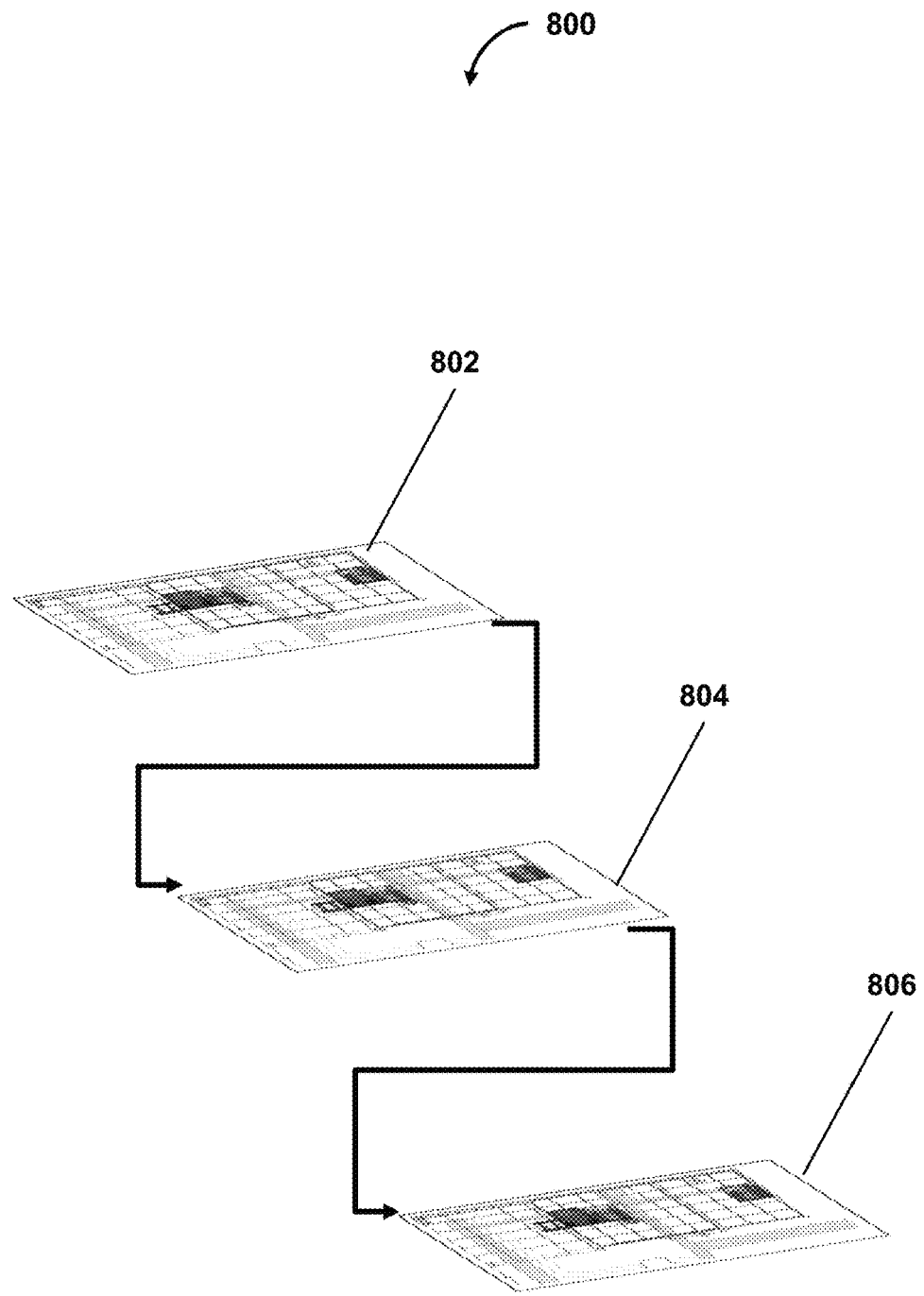
FIG. 8 shows a plurality of layers for playback of events, in accordance with one or more embodiments.

FIG. 8 shows a plurality of layers 800 for playback of events, in accordance with one or more embodiments. For example, FIG. 8 illustrates a previously played layer 802, a currently playing layer 804, and a next layer to be played 806. In some embodiments, sensor event data is loaded onto each of the layers. Sensors may be shown as pins on the layers (e.g., to mark locations of the sensors). For example, pins may be standard shapes, lines, or custom icons or images. In some embodiments, a state of each sensor (e.g., at a time corresponding to the particular layer) may be represented with a color of the sensor (e.g., green, yellow, red, blue, etc.). In some embodiments, when a user navigates to an event (e.g., by selecting an event from first portion 702 of user interface 700, as shown in FIG. 7), the layer corresponding to the selected event is retrieved (e.g., from memory, from database 132, or from another location). In some embodiments, computer system 102 may create a linkage between the layer corresponding to the selected event and previous layers. In some embodiments, computer system 102 may cross reference the current layer with previous layers to ensure that the pins (e.g., corresponding to sensors) are depicted correctly (e.g., location, state, etc.). In some embodiments, computer system 102 may ensure that the layer corresponding to a selected event (e.g., currently playing layer 804) is displayed to the user (e.g., via presentation subsystem 116). In some embodiments, the layer corresponding to the selected event (e.g., currently playing layer 804) may be displayed in the second portion 704 of user interface 700, as shown in FIG. 7.

In some embodiments, layers 802, 804, and 806 may correspond to layers or layer groups. For example, each layer group may comprise multiple events, displays, time points, or other data. In some embodiments, a user selection of an event in a layer group may cause a layer corresponding to the event to be displayed as the visible portion of the corresponding layer group.

Accordingly, the user interface may present activity alerts. In other words, a visual presentation of activity in one or more areas of a venue may be presented for playback, thereby allowing a user to reconstruct a series of events in a monitored area or venue.

Example Flowcharts

Figure 9:
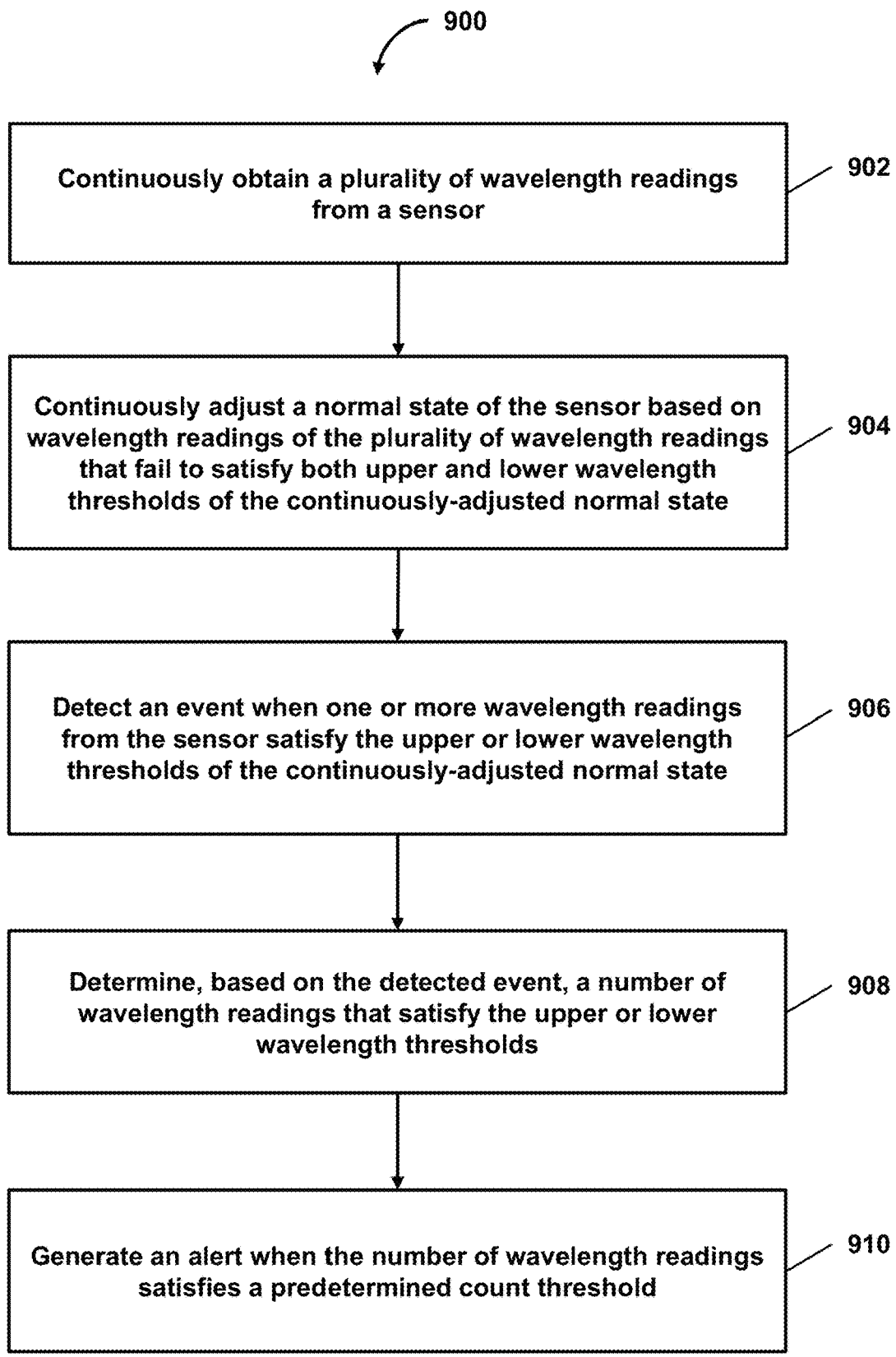
FIG. 9 shows a flowchart of a method for generating a sensor alert based on continuous adjustment of a normal state of a sensor, in accordance with one or more embodiments.
Figure 10:
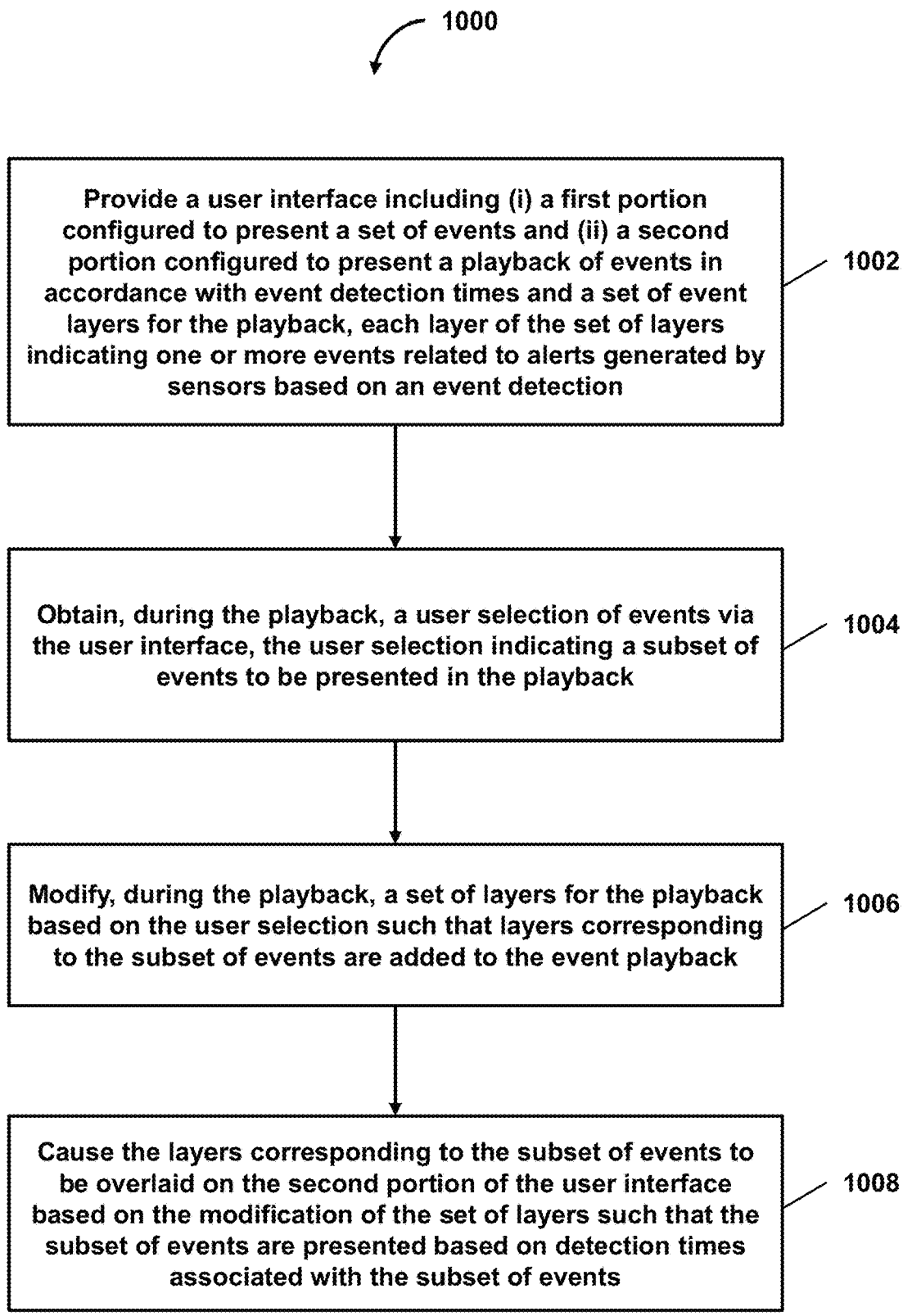
FIG. 10 shows a flowchart of a method for facilitating real-time playback modification for suspicious activity event playback, in accordance with one or more embodiments.

FIGS. 9 and 10 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 9 shows a flowchart of a method 900 for generating a sensor alert based on continuous adjustment of a normal state of a sensor, in accordance with one or more embodiments.

In an operation 902, a plurality of wavelength readings may be obtained from a sensor. For example, the plurality of wavelengths may be continuously received from one or more camera sensors, cable tray sensors, temperature, air quality, or moisture sensors, optical sensors, or other sensors. In some embodiments, operation 902 may be performed by a subsystem that is the same as or similar to communication subsystem 114, in accordance with one or more embodiments.

In an operation 904, a normal state of the sensor may be continuously adjusted based on wavelength readings of the plurality of wavelength readings that fail to satisfy both upper and lower wavelength thresholds of the continuously-adjusted normal state. For example, continuously adjusting the normal state of the sensor may include continuously adjusting a centerline wavelength, the upper wavelength threshold, or the lower wavelength threshold associated with the sensor. In some embodiments, operation 904 may be performed by a subsystem that is the same as or similar to adjustment subsystem 110, in accordance with one or more embodiments.

In an operation 906, an event may be detected when one or more wavelength readings from the sensor satisfy the upper or lower wavelength thresholds of the continuously-adjusted normal state. In other words, an event may be detected when one or more wavelength readings exceed the upper wavelength threshold or fall below the lower wavelength threshold of the continuously-adjusted normal state. In some embodiments, operation 906 may be performed by a subsystem that is the same as or similar to event detection subsystem 112, in accordance with one or more embodiments.

In an operation 908, based on the detected event, a number of wavelength readings that satisfy the upper or lower wavelength thresholds may be determined. As an example, a number of wavelength readings that are above the upper wavelength threshold for a threshold amount of time, a number of consecutive wavelength readings that are above the upper wavelength threshold, a number of wavelength readings that are below the lower wavelength threshold for a threshold amount of time, or a number of consecutive wavelength readings that are below the lower wavelength threshold may be determined. The number of wavelength readings may correspond to a number of changes (e.g., a number of consecutive changes) in the wavelength readings that are above the upper wavelength threshold or below the lower wavelength threshold for a threshold amount of time. In some embodiments, operation 908 may be performed by a subsystem that is the same as or similar to event detection subsystem 112, in accordance with one or more embodiments.

In an operation 910, an alert may be generated when the number of wavelength readings satisfies a predetermined count threshold. In other words, when the number of wavelength readings that exceed the upper wavelength threshold or fall below the lower wavelength threshold is equal to or greater than a predetermined count threshold, an alert may be generated. In some embodiments, operation 908 may be performed by a subsystem that is the same as or similar to presentation subsystem 116 or user interaction subsystem 118, in accordance with one or more embodiments.

FIG. 10 shows a flowchart of a method 1000 for facilitating real-time playback modification for suspicious activity event playback, in accordance with one or more embodiments.

In an operation 1002, a user interface may be provided. The user interface may include (i) a first portion configured to present a set of events and (ii) a second portion configured to present a playback of events in accordance with event detection times and a set of event layers for the playback. Each layer of the set of layers may indicate one or more events related to alerts generated by sensors based on an event detection. In some embodiments, the first portion of the user interface may provide additional information associated with the events. For example, the additional information associated with the events may include a category associated with each event of the set of events, a date and time associated with each event of the set events, or a location associated with each event of the set of events. In some embodiments, the second portion of the user interface may include a location map of infrastructure at a particular location. In some embodiments, operation 1002 may be performed by a subsystem that is the same as or similar to presentation subsystem 116 or user interaction subsystem 118, in accordance with one or more embodiments.

In an operation 1004, during the playback, a user selection of events may be obtained via the user interface. The user selection may indicate a subset of events to be presented in the playback. For example, the user may select a time range, a location, a type of event, a category of events, or another selection. The subset of events may include events which match the user's selections. In some embodiments, operation 1004 may be performed by a subsystem that is the same as or similar to user interaction subsystem 118, in accordance with one or more embodiments.

In an operation 1006, during the playback, a set of layers for the playback may be modified based on the user selection such that layers corresponding to the subset of events are added to the event playback. In some embodiments, in response to a user selection of a subset of events to be presented in the playback, the set of layers associated with the listing of events may be modified such that layers corresponding to the subset of events are added to the event playback and layers not corresponding to the subset of events are removed from the event playback. For example, layers corresponding to the subset of events may be retrieved from a database and added to the event playback. Layers that are not associated with the subset of events may be removed from the event playback. Layers may be stored in a presentation buffer in a database and may be retrieved from the database in response to a user request and search criteria. In some embodiments, operation 1006 may be performed by a subsystem that is the same as or similar to presentation subsystem 116, in accordance with one or more embodiments.

In an operation 1008, the layers corresponding to the subset of events may be caused to be overlaid on the second portion of the user interface based on the modification of the set of layers such that the subset of events are presented based on detection times associated with the subset of events. For example, each event of the subset of events may be associated with a location and a time at which the event was detected. The event may then be mapped to a location on a location map of the infrastructure. For example, the second portion may be overlaid with one layer for each event of the subset of events. In other words, an event layer may include an illustration of an event on top of a location map such that the event layer illustrates where in the infrastructure the event took place. In some embodiments, each layer may correspond to a location map, and the location map associated with one layer may be different from a location map associated with another layer. In some embodiments, operation 1008 may be performed by a subsystem that is the same as or similar to presentation subsystem 116, in accordance with one or more embodiments.

Figure 11:
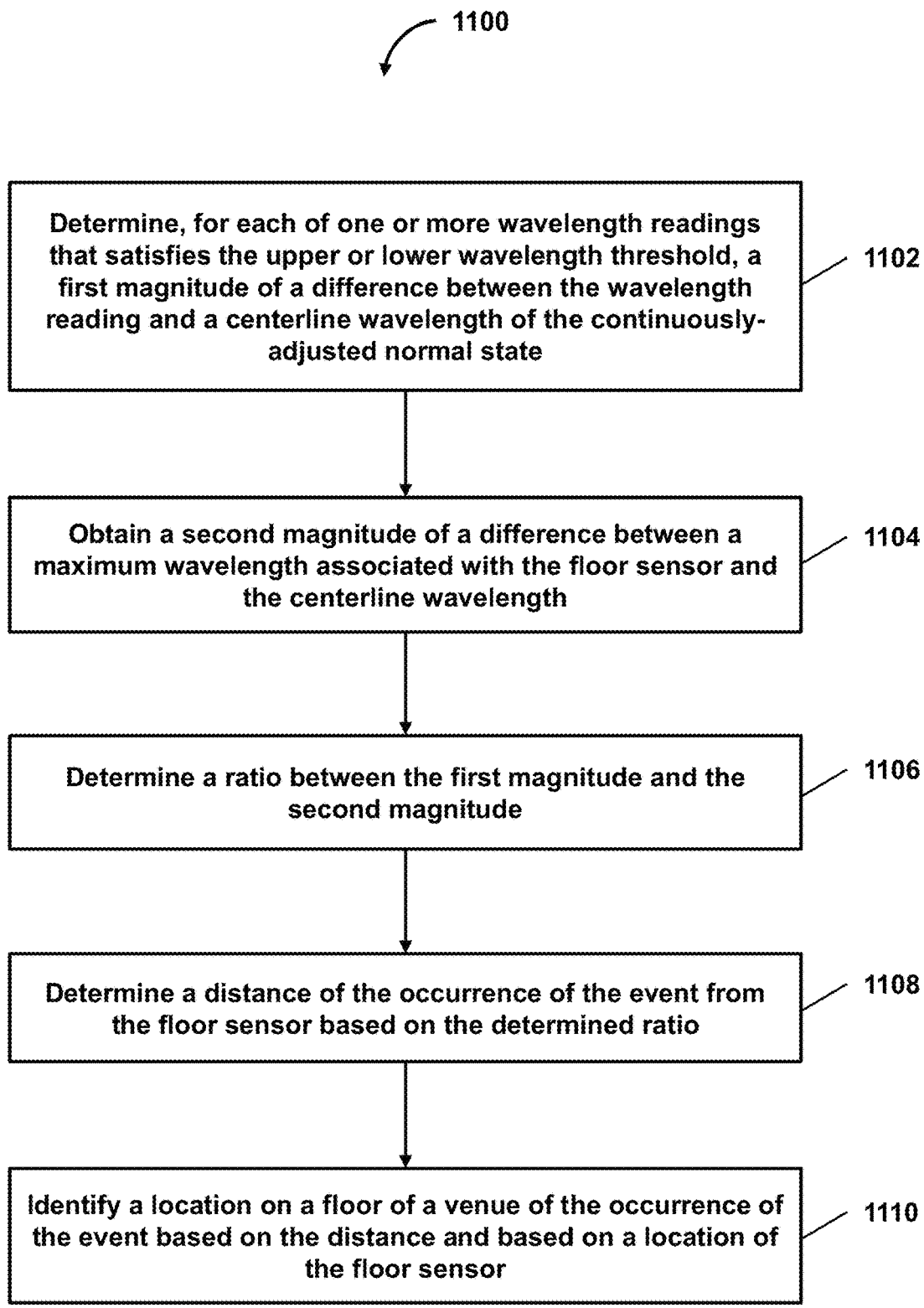
FIG. 11 shows a flowchart of a method for facilitating identification of a location of an occurrence of an event, in accordance with one or more embodiments.

FIG. 11 shows a flowchart of a method 1100 for facilitating identification of a location of an occurrence of an event, in accordance with one or more embodiments.

In an operation 1102, for each of one or more wavelength readings that satisfies the upper or lower wavelength threshold, a first magnitude of a difference between the wavelength reading and a centerline wavelength of the continuously-adjusted normal state may be determined. For example, the first magnitude may be calculated for any wavelength that is greater than the upper wavelength threshold or lower than the lower wavelength threshold. In some embodiments, operation 1102, may be performed by a subsystem that is the same as or similar to event detection subsystem 112, in accordance with one or more embodiments.

In an operation 1104, a second magnitude of a difference between a maximum wavelength associated with the floor sensor and the centerline wavelength may be obtained. In some embodiments, the maximum wavelength may be a maximum threshold limit or minimum threshold limit associated with the sensor. In some embodiments, operation 1104, may be performed by a subsystem that is the same as or similar to event detection subsystem 112, in accordance with one or more embodiments.

In an operation 1106, a ratio between the first magnitude and the second magnitude may be determined. In some embodiments, the ratio between the first magnitude and the second magnitude may be inversely proportional to the distance of the occurrence of the event from the floor sensor. In some embodiments, operation 1106, may be performed by a subsystem that is the same as or similar to event detection subsystem 112, in accordance with one or more embodiments.

In an operation 1108, a distance of the occurrence of the event from the floor sensor based on the determined ratio may be determined. For example, a ratio of one would indicate that the event occurred at the location of the floor sensor. A smaller ratio (e.g., closer to zero) would indicate a larger distance of the occurrence of the event from the sensor and a larger ratio (e.g., closer to one) would indicate a smaller distance of the occurrence of the event from the sensor. In some embodiments, operation 1108, may be performed by a subsystem that is the same as or similar to event detection subsystem 112, in accordance with one or more embodiments.

In an operation 1110, a location on a floor of a venue of the occurrence of the event based on the distance and based on a location of the floor sensor may be identified. The location of the sensor may be known and may be stored in the database. In some embodiments, operation 1110, may be performed by a subsystem that is the same as or similar to event detection subsystem 112, in accordance with one or more embodiments.

In some embodiments, the various computers and subsystems illustrated in FIG. 1 may include one or more computing devices that are programmed to perform the functions described herein. The computing devices may include one or more electronic storages (e.g., database(s) 132), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, Wi-Fi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 110-118, 142-148, or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 110-118 and 142-148 described herein is for illustrative purposes, and is not intended to be limiting, as any of subsystems 110-118 and 142-148 may provide more or less functionality than is described. For example, one or more of subsystems 110-118 and 142-148 may be eliminated, and some or all of its functionality may be provided by other ones of subsystems 110-118 and 142-148. As another example, additional subsystems may be programmed to perform some or all of the functionality attributed herein to one of subsystems 110-118 and 142-148.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present patent filing is one of a set of two filed on the same day by the same applicant. These patent filings have the following titles: METHOD AND SYSTEM FOR GENERATING SENSOR ALERTS BASED ON CONTINUOUS ADJUSTMENT OF A NORMAL STATE OF A SENSOR and REAL-TIME PLAYBACK MODIFICATION FOR ACTIVITY EVENT PLAYBACK. The entire contents of each of the patent filings other than this one is hereby incorporated by reference.

The present techniques will be better understood with reference to the following enumerated embodiments:

1. A method comprising: continuously obtaining a plurality of wavelength readings from a sensor; continuously adjusting a normal state of the sensor based on wavelength readings of the plurality of wavelength readings that fail to satisfy both upper and lower wavelength thresholds of the continuously-adjusted normal state; detecting an event when one or more wavelength readings from the sensor satisfy the upper or lower wavelength thresholds of the continuously-adjusted normal state; determining, based on the detected event, a number of wavelength readings that satisfy the upper or lower wavelength threshold; and generating an alert when the number of wavelength readings satisfies a predetermined count threshold.

2. The method according to embodiment 1, further comprising: determining a duration of the event occurring at or near the sensor based on the number of wavelength readings, wherein the number of wavelength readings is directly proportional to the duration of the event occurring at or near the sensor.

3. The method according to any of embodiments 1-2, further comprising: determining, for each of the one or more wavelength readings that satisfies the upper wavelength threshold, a first magnitude of a difference between the wavelength reading and a centerline wavelength of the continuously-adjusted normal state; obtaining a second magnitude of a difference between a maximum wavelength associated with the sensor and the centerline wavelength; determining a ratio between the first magnitude and the second magnitude; determining a distance of the occurrence of the event from the sensor based on the determined ratio; and identifying a location on a floor of a venue of the occurrence of the event based on the distance and based on a location of the sensor, wherein the ratio between the first magnitude and the second magnitude is inversely proportional to the distance of the occurrence of the event from the sensor.

4. The method according to any of embodiments 1-3, further comprising: determining, for each of the one or more wavelength readings that satisfies the lower wavelength threshold, a first magnitude of a difference between the wavelength reading and a centerline wavelength of the continuously-adjusted normal state; obtaining a second magnitude of a difference between a maximum wavelength associated with the sensor and the centerline wavelength; determining a ratio between the first magnitude and the second magnitude; determining a distance of the occurrence of the event from the sensor based on the determined ratio; and identifying a location on a floor of a venue of the occurrence of the event based on the distance and based on a location of the sensor, wherein the ratio between the first magnitude and the second magnitude is inversely proportional to the distance of the occurrence of the event from the sensor.

5. The method according to any of embodiments 1-4, wherein the centerline wavelength is an average of the plurality of wavelength readings.

6. The method according to any of embodiments 1-5, further comprising: adjusting a rate of obtaining additional wavelength readings based on the number of the one or more wavelength readings that satisfy the upper or lower wavelength thresholds, wherein the rate is increased when the number of the one or more wavelength readings exceeds the predetermined count threshold.

7. The method according to any of embodiments 1-6, wherein continuously adjusting the normal state of the sensor includes continuously adjusting a centerline wavelength, the upper wavelength threshold, and the lower wavelength threshold associated with the sensor.

8. The method according to any of embodiments 1-7, wherein the sensor is a floor sensor, wherein the floor sensor is a wavelength-specific reflector.

9. A method comprising: providing a user interface including (i) a first portion configured to present a listing of events and (ii) a second portion configured to present a playback of events on a location map in accordance with event detection times and a set of event layers for the event playback, each layer of the set of event layers indicating one or more events related to activity alerts generated by sensors based on an event detection; obtaining, during the playback, a user selection of events via the user interface, the user selection indicating a subset of events to be presented in the playback; modifying, during the playback, a set of layers for the playback based on the user selection such that layers corresponding to the subset of events are added to the event playback; and causing the layers corresponding to the subset of events to be overlaid on the second portion of the user interface based on the modification of the set of layers such that the subset of events is presented based on detection times associated with the subset of events.

10. The method according to embodiment 8, wherein the first portion is an event list portion.

11. The method according to any of embodiments embodiment 9-10, wherein the second portion is an event playback portion.

12. The method according to any of embodiment 9-11, further comprising: while the event playback is occurring, obtaining another user selection of events via the event list portion of the user interface, the second user selection indicating another subset of events that is not to be presented in the event playback; and while the event playback is occurring, modifying the set of layers for the event playback based on the user selection such that other event layers corresponding to the other subset of events are removed from the event playback 13. The method according to any of embodiments 9-12, wherein each layer of the set of layers is overlaid onto the location map for a predetermined amount of time.

14. The method according to any of embodiments embodiment 9-13, wherein the set of events includes a category associated with each event of the set of events, a date and time associated with each event of the set events, a location associated with each event of the set of events, and an action icon associated with one or more events of the set of events.

15. The method according to any of embodiments 9-14, further comprising: responsive to a selection of the action icon associated with an event of the set of events, causing a new window to be loaded on the user interface, the new window including additional information associated with the event.

16. The method according to any of embodiments 9-15, further comprising: causing a previously overlaid layer to be overlaid again onto the second portion of the user interface in response to another user selection, wherein the other user selection corresponds to a selection to rewind the playback.

17. The method according to any of embodiments 9-16, further comprising: causing a listing of an event associated with a currently overlaid layer to be highlighted on the first portion of the user interface.

18. The method according to any of embodiments 9-17, further comprising: causing a size of text associated with the subset of events to be increased in proportion to a difference between a number of events in the set of events and a number of events in the subset of events.

19. The method according to any of embodiments 9-18, further comprising: updating a presentation buffer in response to the user selection such that the presentation buffer is updated to include the layers corresponding to the subset of events; and causing the layers from the presentation buffer to be overlaid on the second portion of the user interface 20. The method according to any of embodiments 9-19, wherein updating the presentation buffer includes removing, from the presentation buffer, one or more layers corresponding to one or more events that are included in the set of events and excluded from the subset of events.

21. A tangible, non-transitory, computer-readable medium storing instructions that, when executed by a data processing apparatus, cause the data processing apparatus to perform operations comprising those of any of embodiments 1-20.

22. A system comprising: one or more processors; and memory storing instructions that, when executed by the processors, cause the processors to effectuate operations comprising those of any of embodiments 1-20.

What is claimed is:

1. A method for facilitating real-time playback modification for activity event playback, the method being implemented by one or more processors configured to execute one or more computer program instructions, the method comprising:

providing a user interface including (i) an event list portion configured to present a listing of events and (ii) an event playback portion configured to present a playback of events on a location map in accordance with event detection times and a set of event layers for the event playback, each layer of the set of event layers indicating one or more events related to activity alerts generated by sensors based on an event detection;

while the event playback is occurring, obtaining a user selection of events via the event list portion of the user interface, the user selection indicating a first subset of events not to be presented in the event playback and a second subset of events to be presented in the event playback;

while the event playback is occurring, modifying a set of layers for the event playback based on the user selection such that, first event layers corresponding to the first subset of events are removed from the event playback, and second event layers corresponding to the second subset of events are retrieved from a database and added to the event playback; and causing the second event layers to be overlaid onto the location map based on the modification of the set of layers such that the second subset of events is presented based on detection times associated with the second subset of events.

2. The method according to claim 1, wherein each layer of the set of layers is overlaid onto the location map for a predetermined amount of time.

3. The method according to claim 1, wherein the listing of events includes a category associated with each event of the listing of events, a date and time associated with each event of the listing of events, a location associated with each event of the listing of events, and an action icon associated with one or more events of the listing of events.

4. The method according to claim 3, further comprising:
responsive to a selection of the action icon associated with an event of the second subset of events, causing a new window to be loaded on the user interface, the new window including additional information associated with the event.

5. The method according to claim 1, further comprising:
causing a previously overlaid layer to be overlaid again onto the location map in response to another user selection, wherein the other user selection corresponds to a selection to rewind the event playback.

6. The method according to claim 1, further comprising:
causing a listing of an event associated with a currently overlaid layer to be highlighted on the event list portion of the user interface.

7. The method according to claim 1, further comprising:
causing a size of text associated with the second subset of events to be increased in proportion to a difference between a number of events in the listing of events and a number of events in the second subset of events.

8. A system, comprising:
a computer system that comprises one or more processors programed with computer program instructions that, when executed, cause the computer system to:
provide a user interface including (i) a first portion configured to present a set of events and (ii) a second portion configured to present a playback of events in accordance with event detection times and a set of event layers for the playback, each layer of the set of layers indicating one or more events related to alerts generated by sensors based on an event detection;
obtain, during the playback, a user selection of events via the user interface, the user selection indicating a subset of events to be presented in the playback;
modify, during the playback, a set of layers for the playback based on the user selection such that layers corresponding to the subset of events are added to the event playback; and
cause the layers corresponding to the subset of events to be overlaid on the second portion of the user interface based on the modification of the set of layers such that the subset of events is presented based on detection times associated with the subset of events.

9. The system according to claim 8, wherein each layer of the set of layers is overlaid on the second portion of the user interface for a predetermined amount of time.

10. The system according to claim 8, wherein the set of events includes a category associated with each event of the set of events, a date and time associated with each event of the set events, a location associated with each event of the set of events, and an action icon associated with one or more events of the set of events.

11. The system according to claim 10, wherein the computer system is caused to:
responsive to a selection of the action icon associated with an event of the set of events, cause a new window to be loaded on the user interface, the new window including additional information associated with the event.

12. The system according to claim 8, wherein the computer system is caused to:
cause a previously overlaid layer to be overlaid again onto the second portion of the user interface in response to another user selection, wherein the other user selection corresponds to a selection to rewind the playback.

13. The system according to claim 8, wherein the computer system is caused to:
cause a listing of an event associated with a currently overlaid layer to be highlighted on the first portion of the user interface.

14. The system according to claim 8, wherein the computer system is caused to:
cause a size of text associated with the subset of events to be increased in proportion to a difference between a number of events in the set of events and a number of events in the subset of events.

15. The system according to claim 8, wherein the computer system is caused to:
update a presentation buffer in response to the user selection such that the presentation buffer is updated to include the layers corresponding to the subset of events; and
cause the layers from the presentation buffer to be overlaid on the second portion of the user interface.

16. The system according to claim 15, wherein updating the presentation buffer includes removing, from the presentation buffer, one or more layers corresponding to one or more events that are included in the set of events and excluded from the subset of events.

17. One or more non-transitory, computer-readable media storing instructions that, when executed by one or more processors, effectuate operations comprising:
providing a user interface including (i) a first portion configured to present a set of events and (ii) a second portion configured to present a playback of events in accordance with event detection times and a set of event layers for the playback, each layer of the set of layers indicating one or more events related to alerts generated by sensors based on an event detection;
obtaining, during the playback, a user selection of events via the user interface, the user selection indicating a subset of events to be presented in the playback;
modifying, during the playback, a set of layers for the playback based on the user selection such that layers corresponding to the subset of events are added to the event playback; and
causing the layers corresponding to the subset of events to be overlaid on the second portion of the user interface based on the modification of the set of layers such that the subset of events is presented based on detection times associated with the subset of events.

18. The non-transitory, computer-readable media according to claim 17, further comprising:
causing a size of text associated with the subset of events to be increased in proportion to a difference between a number of events in the set of events and a number of events in the subset of events.

19. The non-transitory, computer-readable media according to claim 17, further comprising:

updating a presentation buffer in response to the user selection such that the presentation buffer is updated to include the layers corresponding to the subset of events; and causing the layers from the presentation buffer to be overlaid on the second portion of the user interface.

20. The non-transitory, computer-readable media according to claim 19, wherein updating the presentation buffer includes removing, from the presentation buffer, one or more layers corresponding to one or more events that are included in the set of events and excluded from the subset of events.

* * * * *